(12) United States Patent
Hoshtanar et al.

(10) Patent No.: US 12,190,626 B2
(45) Date of Patent: Jan. 7, 2025

(54) FINGERPRINT SENSOR PACKAGES

(71) Applicant: Cypress Semiconductor Corporation, San Jose, CA (US)

(72) Inventors: Oleksandr Hoshtanar, Lviv (UA); Igor Kravets, Lviv (UA); Oleksandr Karpin, Lviv (UA); Bo Chang, Cupertino, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/181,455

(22) Filed: Mar. 9, 2023

(65) Prior Publication Data

US 2024/0304023 A1    Sep. 12, 2024

(51) Int. Cl.
*G06V 40/13*      (2022.01)
*G02F 1/133*      (2006.01)

(52) U.S. Cl.
CPC ...... *G06V 40/1306* (2022.01); *G02F 1/13312* (2021.01)

(58) Field of Classification Search
CPC ........... G06V 40/1329; G06V 40/1306; G06V 40/1318; G02F 1/13312; G02F 1/13318
See application file for complete search history.

(56) References Cited

U.S. PATENT DOCUMENTS

| | | | |
|---|---|---|---|
| 10,055,631 B1* | 8/2018 | Wen | H01L 23/49816 |
| 2017/0110416 A1* | 4/2017 | Miao | G06V 40/1329 |
| 2021/0117743 A1* | 4/2021 | Pueschner | G06K 19/07775 |
| 2023/0177300 A1* | 6/2023 | Lee | G06V 40/1329 |
| | | | 438/106 |

* cited by examiner

*Primary Examiner* — Yuzhen Shen

(57) ABSTRACT

A sensor package includes at least one die, a fingerprint sensor, a mold material, and a land grid array. The fingerprint sensor is electrically coupled to the at least one die. The mold material encapsulates the at least one die. The land grid array layer is electrically coupled to the at least one die. The land grid array layer, the fingerprint sensor, and the mold material each include a common footprint.

18 Claims, 22 Drawing Sheets

FINGERPRINT SENSOR PACKAGES

BACKGROUND

Mutual capacitance fingerprint sensors on integrated circuit packages are typically fabricated on a flip-chip substrate. When the die is attached to the flip-chip substrate, the resulting thickness of the assembled package typically has a thickness greater than 0.45 millimeters. Current payment cards (e.g., credit, debit, etc.) typically have a thickness of 0.45 millimeters or less. Flip-chip methods also involve a pick-and-place stage, which adds significant cost, especially in the case where the package includes two dies and several passive components.

For these and other reasons, a need exists for the present invention.

SUMMARY

Some examples of the present disclosure relate to a sensor package. The sensor package includes at least one die, a fingerprint sensor, a mold material, and a land grid array. The fingerprint sensor is electrically coupled to the at least one die. The mold material encapsulates the at least one die. The land grid array layer is electrically coupled to the at least one die. The land grid array layer, the fingerprint sensor, and the mold material each include a common footprint.

Other examples of the present disclosure relate to a sensor package. The sensor package includes at least one die, a fingerprint sensor, and a mold material. The fingerprint sensor includes a first redistribution layer and a second redistribution layer. The fingerprint sensor is electrically coupled to the at least one die and laterally offset with respect to the at least one die. The mold material encapsulates the at least one die. The first redistribution layer includes a land grid array electrically coupled to the at least one die.

Yet other examples of the present disclosure relate to a method for fabricating a sensor package. The method includes forming a fingerprint sensor including a first redistribution layer and a second redistribution layer on a temporary carrier. The method includes arranging at least one die on the temporary carrier. The method includes encapsulating the at least one die with a mold material. The method includes electrically coupling the at least one die to the fingerprint sensor, and removing the temporary carrier.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1A:
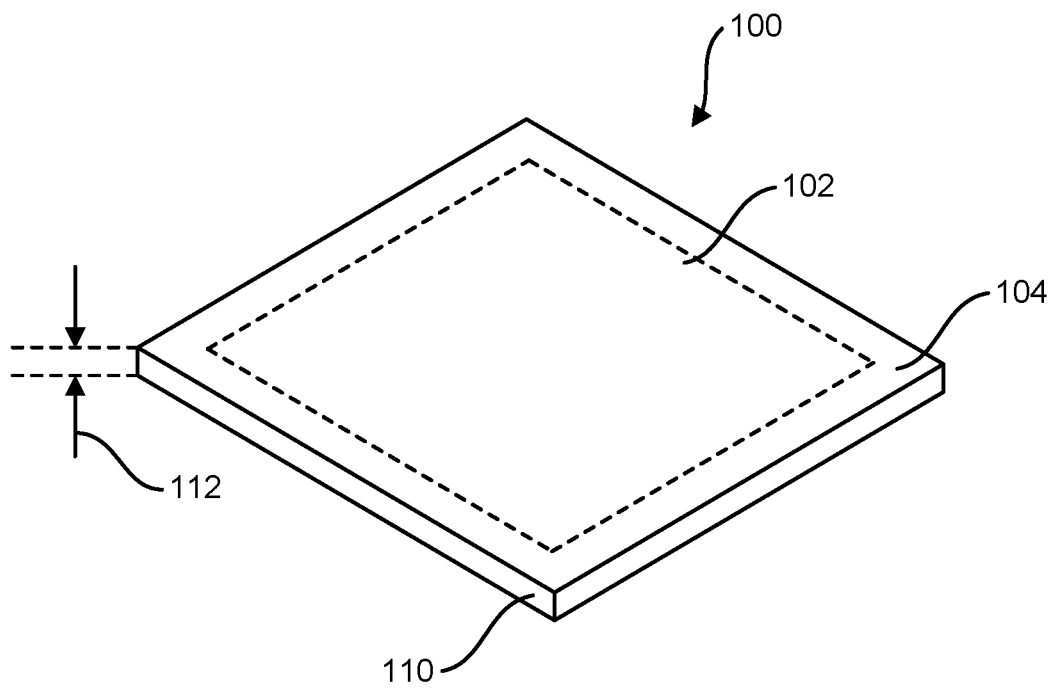
FIG. 1A is a top view and FIG. 1B is a bottom view of one example of a sensor package.
Figure 1B:
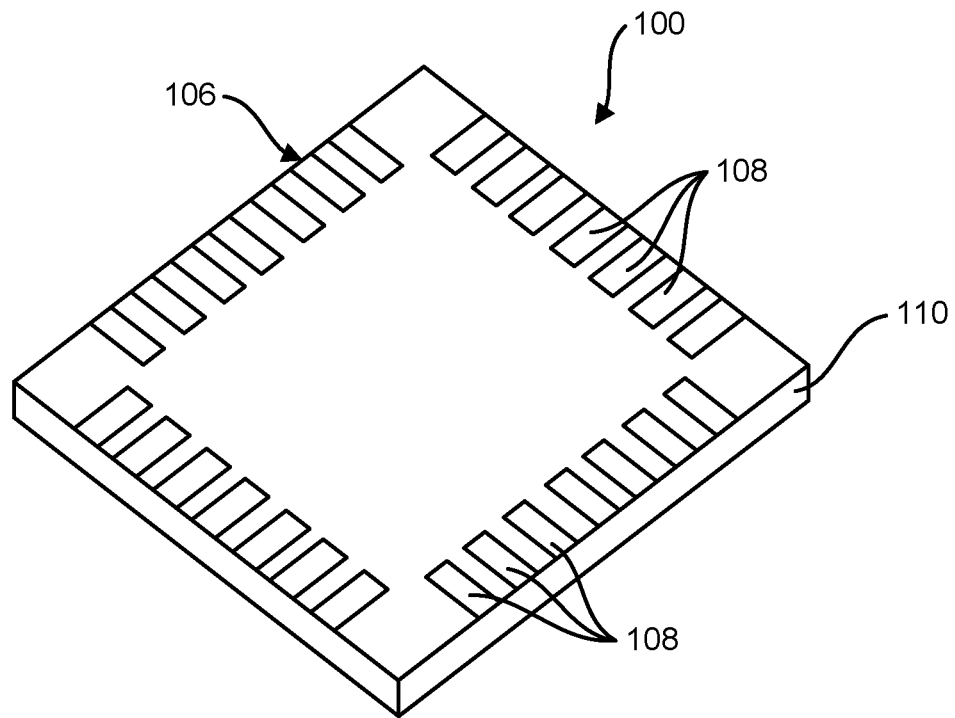

FIG. 1A is a top view and FIG. 1B is a bottom view of one example of a sensor package 100. As shown in FIG. 1A, sensor package 100 includes a fingerprint sensor 102 (e.g., a mutual capacitance fingerprint sensor) indicated by dashed lines under an insulating layer 104 (e.g., polyimide coating) on the top surface of the sensor package. As shown in FIG. 1B, sensor package 100 includes a land grid array layer 106 including a plurality of contacts 108. As will be described further below, in some examples, between the fingerprint sensor 102 and the land grid array layer 106, sensor package 100 may also include at least one die (e.g., a sensing die, secure element die) and passive components (e.g., capacitors) electrically coupled to the fingerprint sensor 102 and/or to the land grid array layer 106, which are encapsulated in a mold material 110.

Sensor package 100 is a Wafer Level Package (WLP). By fabricating sensor package 100 using WLP processes, the cost and thickness of the sensor package is reduced compared to using a flip-chip substrate. For example, the sensor package 100 may include a thickness as indicated at 112 in FIG. 1A less than or equal to 450 micrometers. In addition, sensor package 100 may be fabricated without a pick-and-place stage, thereby reducing the cost of the sensor package.

Figure 2A:
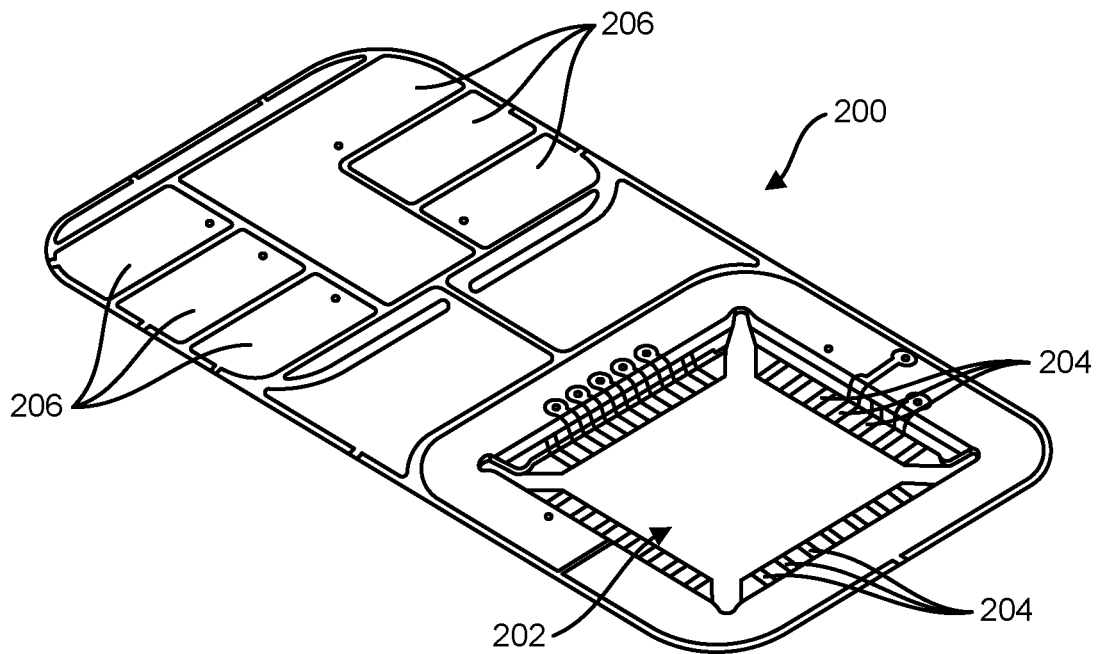
FIG. 2A is a top view of one example of a module prior to installing a sensor package.
Figure 2B:
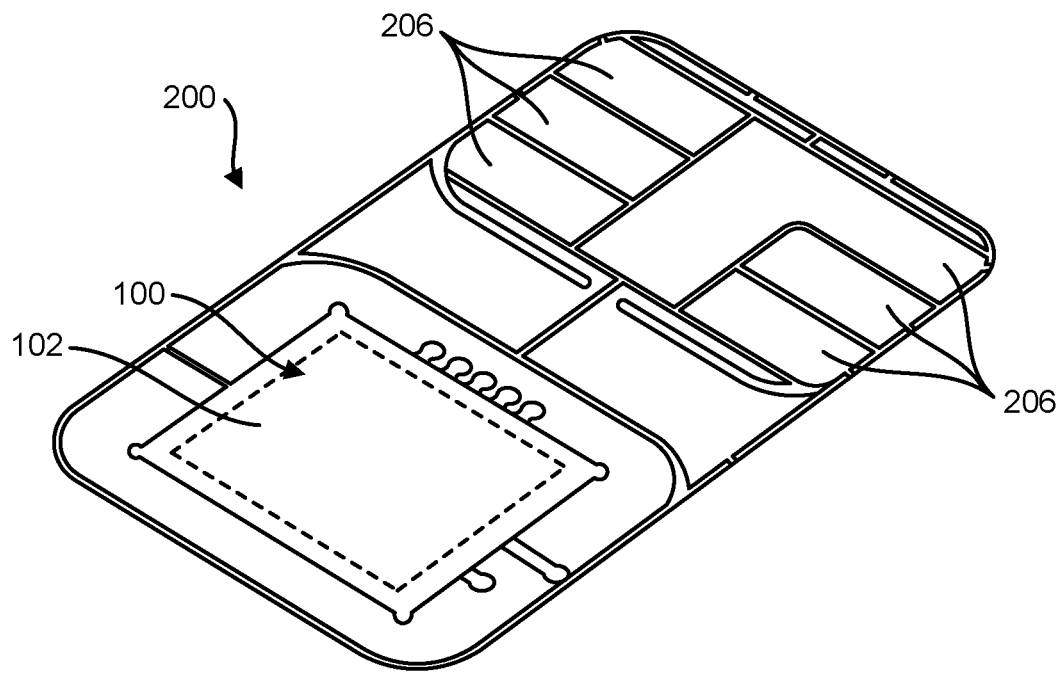
FIG. 2B is a top view and FIG. 2C is a bottom view of one example of a module including an installed sensor package.
Figure 2C:
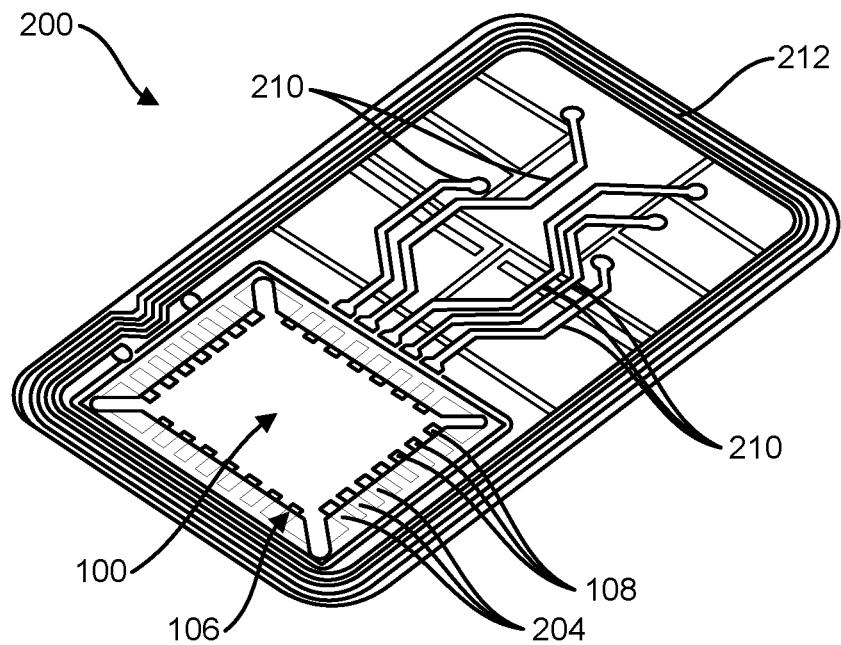

FIG. 2A is a top view of one example of a module 200 prior to installing a sensor package, such as sensor package 100 of FIGS. 1A and 1B. FIG. 2B is a top view and FIG. 2C is a bottom view of one example of a module 200 including an installed sensor package 100. As illustrated in FIG. 2A, module 200 includes a socket 202 and contacts 206 (e.g., ISO contacts). Socket 202 includes a plurality of downset contacts 204. As illustrated in the top view of FIG. 2B, socket 202 is configured to receive a sensor package 100 with the fingerprint sensor 100 facing away from the contacts 204. As illustrated in the bottom view of FIG. 2C, with the sensor package 100 installed in the socket 202, each contact 204 of the socket 202 is electrically coupled to a corresponding contact 108 of the land grid array layer 106 of the sensor package 100. The depth of the socket 202 may be greater than or equal to the thickness 112 (FIG. 1A) of the sensor package 100, such that with the sensor package 100 installed in the socket 202, the sensor package 100 does not protrude from the top surface of the module 200.

In addition, as illustrated in the bottom view of FIG. 2C, module 200 includes a plurality of electrical traces 210 to electrically connect the contacts 206 to the contacts 204 of the socket 202. Module 200 may also include a module antenna 212 around the outer edge of the module and electrically connected to the contacts 204 of the socket 202. Module antenna 212 may be configured for inductive coupling with a booster antenna of a card to be described below with reference to FIG. 3.

Figure 3:
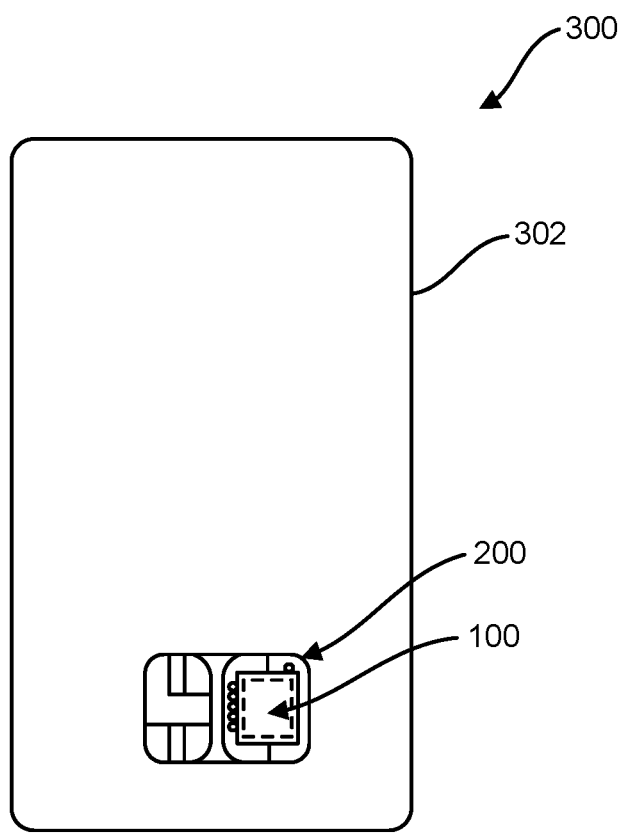
FIG. 3 is a top view of one example of a card including a module.

FIG. 3 is a top view of one example of a card 300 including a module 200, which includes a sensor package 100. Card 300 may be a payment card (e.g., credit, debit, etc.), an access card (e.g., door lock, gate lock, etc.), an identity card (e.g., driver's license, passport, etc.), or another suitable card. Card 300 may include a booster antenna 302 around the outer edge of the card. Booster antenna 302 may be configured for inductive coupling with a module antenna 212 of the module 200. Card 300 may be a contactless smart card that enables fingerprint authentication via sensor package 100 prior to allowing the card to be used for payment, access, identity verification, etc.

Figure 4:
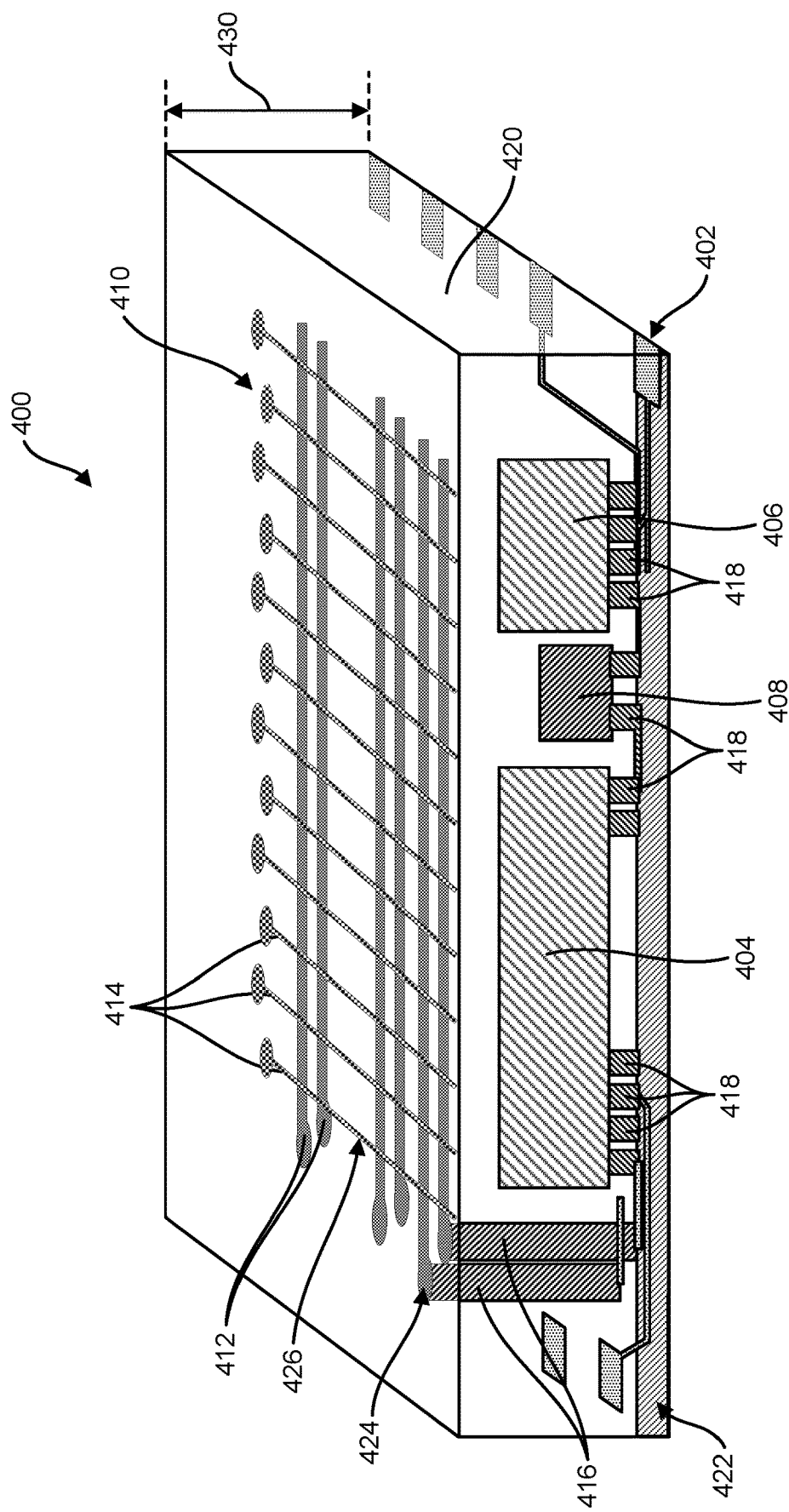
FIG. 4 illustrates one example of a sensor package.

FIG. 4 illustrates one example of a sensor package 400. It is noted that FIG. 4 has been simplified for illustrative purposes. In one example, sensor package 400 may provide sensor package 100 previously described and illustrated with reference to FIGS. 1A-3. Sensor package 400 includes a land grid array layer 402, a redistribution layer 422, a sensing die 404, a secure element die 406, a capacitor(s) 408, a fingerprint sensor 410, a plurality of vias 416 (e.g., via posts), a plurality of vias 418 (e.g., metal pillars), and a mold material 420 (e.g., polymer). While sensor package 400 may include more than one capacitor 408, only one capacitor 408 is illustrated in FIG. 4 for simplicity. The redistribution layer 422 is over the land grid array layer 402. The fingerprint sensor 410 includes a redistribution layer 424 and a redistribution layer 426 over the redistribution layer 424.

Contacts of the sensing die 404, contacts of the secure element die 406, and contacts of the capacitor 408 face the land grid array layer 402 and face away from the fingerprint sensor 410. The sensing die 404, the secure element die 406, and/or the capacitor 408 are electrically coupled to each other and/or the land grid array layer 402 through vias 418 and redistribution layer 422. The sensing die 404 and/or the capacitor 408 are also electrically coupled to the fingerprint sensor 410 through vias 418, redistribution layer 422, and vias 416. The redistribution layer 424 includes transmit lines 412 of the fingerprint sensor 410, and the redistribution layer 426 includes receive lines 414 of the fingerprint sensor 410 perpendicular to the transmit lines 412. In some examples, the transmit lines 412 may have a width of about 55 micrometers and a pitch of about 70 micrometers, and the receive lines 414 may have a width of about 5 micrometers and a pitch of about 75 micrometers. The mold material 420 encapsulates the sensing die 404, secure element die 406, capacitor 408, and vias 416 and 418. The land grid array layer 402, the fingerprint sensor 410, and the mold material 420 each include a common footprint. In some examples, the land grid array layer 402 includes contacts at least partially aligned with the sensing die 404 and/or the secure element die 406 in a direction perpendicular to the land grid array layer 402. Sensor package 400 has a thickness as indicated at 430 less than or equal to 450 micrometers.

While two vias 416 are illustrated in FIG. 4, sensor package 400 may include as many as 220 vias or more extending from the redistribution layer 422 to the fingerprint sensor 410 through the mold material 420 to electrically couple the sensing die 404 to the fingerprint sensor 410 (i.e., to each transmit line 412 and each receive line 414).

In some examples, the sensing die 404 may have a width of about 3 millimeters and a length of about 4 millimeters. The sensing die 404 may include a Field Programmable Gate Array (FPGA), a system-on-chip (SOC), or another suitable logic circuit for operating fingerprint sensor 410. In some examples, the secure element die 406 may have a width of about 2 millimeters and a length of about 2 millimeters. The secure element die 406 may include suitable logic for performing cryptographic functions. In other examples, the sensing die 404 and the secure element die 406 may be combined into a single die. In some examples, the capacitor(s) 408 may be a 0.1 microfarad capacitor.

Figure 5:
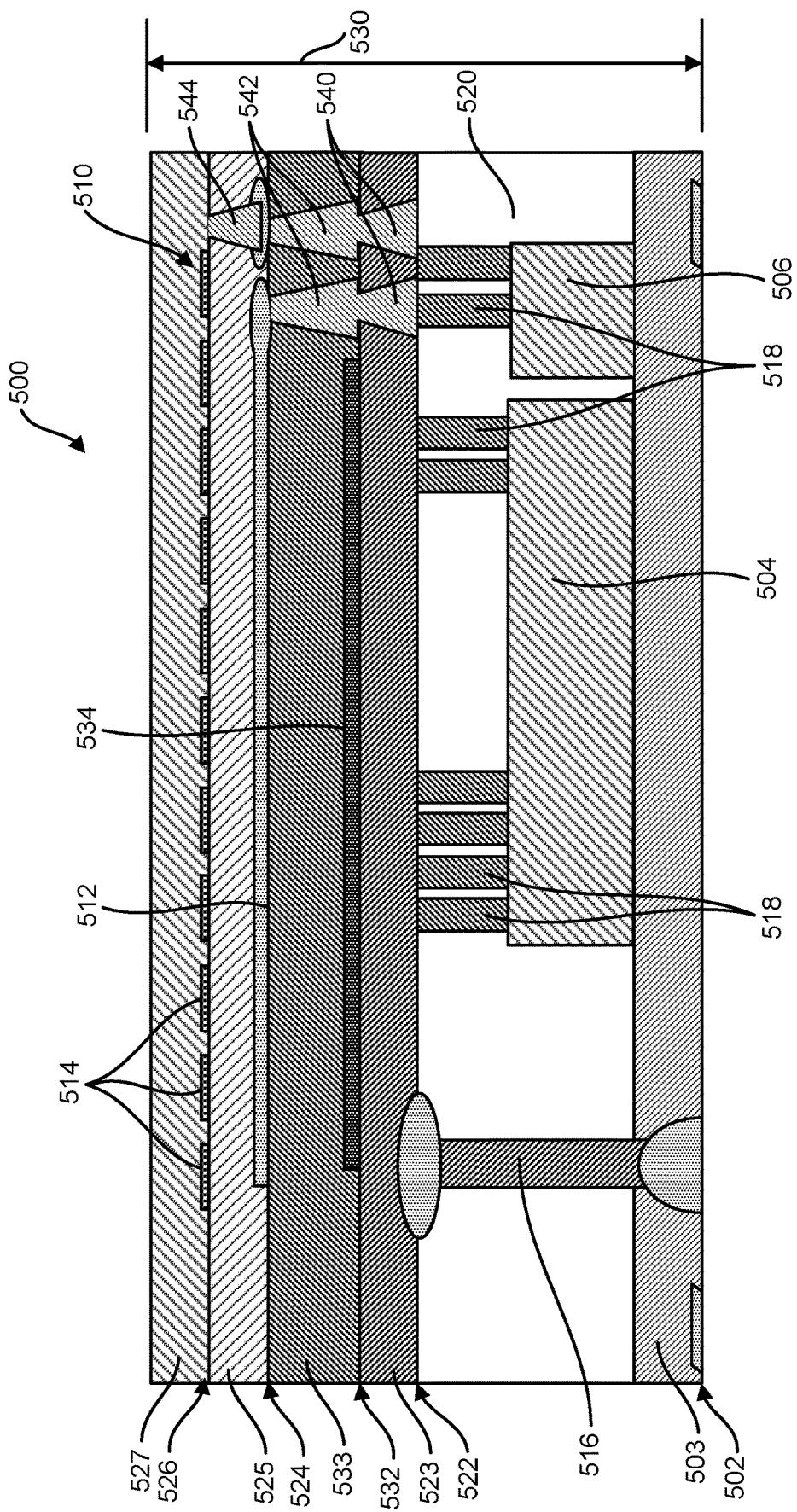
FIG. 5 illustrates a simplified cross-sectional view of another example of a sensor package.

FIG. 5 illustrates a simplified cross-sectional view of another example of a sensor package 500. In one example, sensor package 500 may provide sensor package 100 previously described and illustrated with reference to FIGS. 1A-3. Sensor package 500 includes a land grid array layer 502, a sensing die 504, a secure element die 506, a fingerprint sensor 510 including a redistribution layer 524 and a redistribution layer 526, a plurality of vias 516 (e.g., via posts), a plurality of vias 518 (e.g., metal pillars), a mold material 520 (e.g., polymer), a redistribution layer 522, a redistribution layer 532 including a shield layer 534, and a plurality of vias 540, 542, and 544. Sensor package 500 may also include a capacitor(s) similarly as included in sensor package 400 of FIG. 4.

The redistribution layer 522 may be covered/encapsulated by an insulating layer 523, and vias 540 may extend through the insulating layer 523. The redistribution layer 532 may be covered/encapsulated by an insulating layer 533, and vias 542 may extend through the insulating layer 533. The redistribution layer 524 may be covered/encapsulated by an insulating layer 525, and the vias 544 may extend through the insulating layer 525. The redistribution layer 526 may be covered/encapsulated by an insulating layer 527. The redistribution layer 524 includes transmit lines 512 of the fingerprint sensor 510, and redistribution layer 526 includes receive lines 514 of the fingerprint sensor 510 perpendicular to the transmit lines 512. In some examples, the transmit lines 512 may have a width of about 55 micrometers and a pitch of about 70 micrometers, and the receive lines 514 may have a width of about 5 micrometers and a pitch of about 75 micrometers.

The land grid array layer 502 may be covered/encapsulated in an insulating layer 503, which may have a thickness greater than about 50 micrometers. Contacts of the sensing die 518 and contacts of the secure element die 506 face the fingerprint sensor 510 and face away from the land grid array layer 502. The sensing die 504 and secure element die 506 are arranged on the insulating layer 503 with the contacts of the sensing die 504 and secure element die 506 facing away from the insulating layer 503. The land grid array layer 502 is electrically coupled to the sensing die 504 and/or the secure element die 506 through vias 516, redistribution layer 522, and vias 518. The sensing die 504 is also electrically coupled to the fingerprint sensor (i.e., to each transmit line 512 and each receive line 514) through the redistribution layers 522, 532, 524, and 526 and vias 540, 542, and 544. The secure element die 506 is electrically coupled to the sensing die 504 through corresponding vias 518 and redistribution layer 522.

The shield layer 534 in the redistribution layer 532 is between the fingerprint sensor 510 and the sensor die 504 and secure element die 506. Shield layer 534 may include a metal plate or metal grid to the shield sensing die 504 and secure element die 506 from electromagnetic interference from fingerprint sensor 510 and/or external sources.

The mold material 520 encapsulates the sensing die 504, secure element die 506, vias 516, and vias 518. The land grid array layer 502, the fingerprint sensor 510, and the mold material 520 each include a common footprint. In some examples, sensor package 500 may have a thickness as indicated at 530 less than or equal to 450 micrometers.

While one via 516 is illustrated in FIG. 5, sensor package 500 may include as many as 15 vias or more extending from the land grid array layer 502 to the redistribution layer 522 through the mold material 520 to electrically couple the sensing die 504 and/or the secure element die 506 to the land grid array layer 502. Compared to sensor package 400 of FIG. 4, the sensor package 500 of FIG. 5 may be easier to fabricate since sensor package 500 includes far fewer vias 516 compared to vias 416 included in sensor package 400.

In some examples, the sensing die 504 may have a width of about 3 millimeters and a length of about 4 millimeters. The sensing die 504 may include a Field Programmable Gate Array (FPGA), a system-on-chip (SOC), or another suitable logic circuit for operating fingerprint sensor 510. In some examples, the secure element die 506 may have a width of about 2 millimeters and a length of about 2 millimeters. The secure element die 506 includes suitable logic for performing cryptographic functions. In other examples, the sensing die 504 and the secure element die 506 may be combined into a single die.

Figure 6:
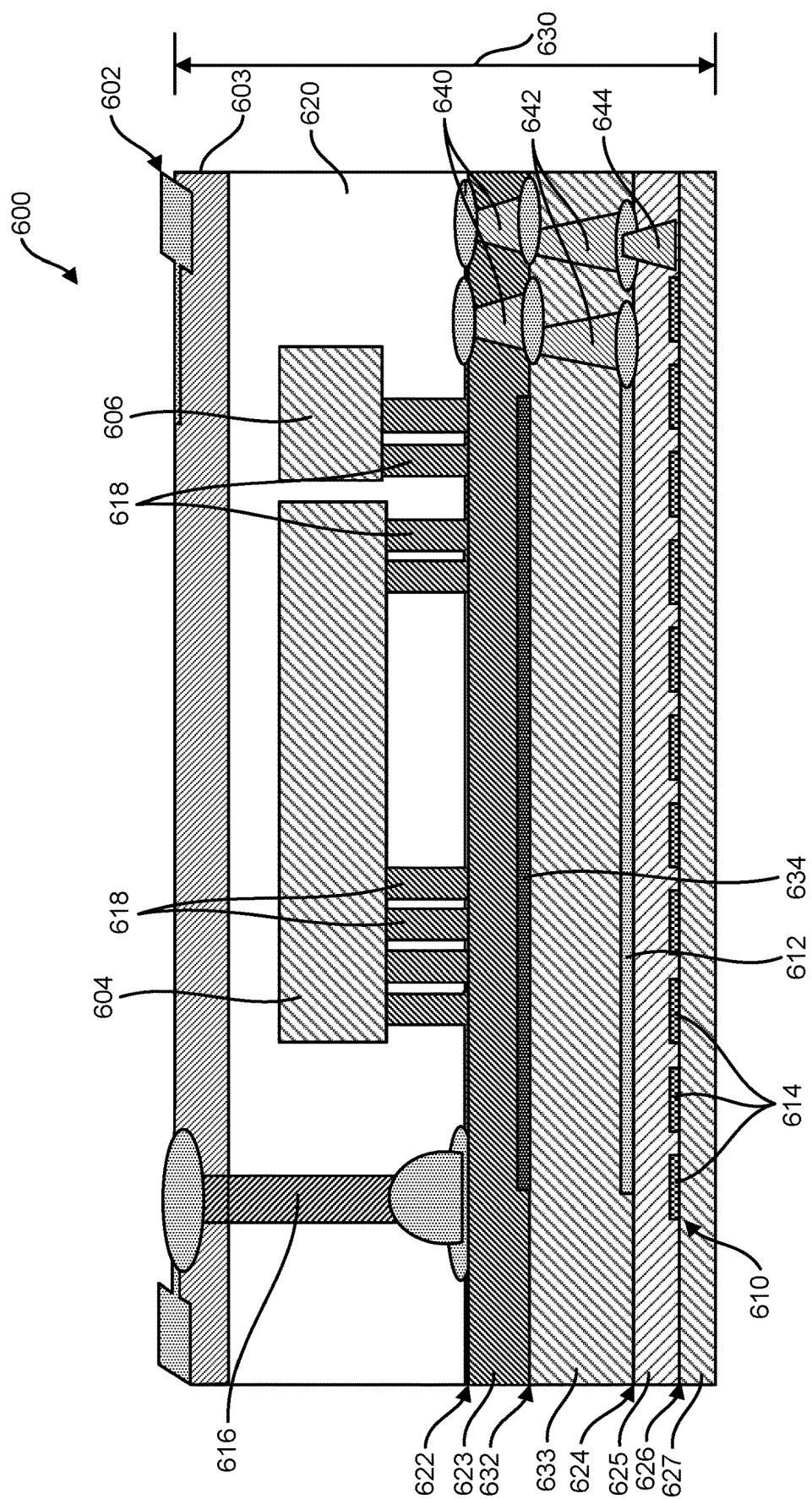
FIG. 6 illustrates a simplified cross-sectional view of yet another example of a sensor package.

FIG. 6 illustrates a simplified cross-sectional view of yet another example of a sensor package 600. In one example, sensor package 600 may provide sensor package 100 previously described and illustrated with reference to FIGS. 1A-3. Sensor package 600 includes a land grid array layer 602, a sensing die 604, a secure element die 606, a fingerprint sensor 610 including a redistribution layer 624 and a redistribution layer 626, a plurality of via 616 (e.g., via posts), a plurality of vias 618 (e.g., metal pillars), a mold material 620 (e.g., polymer), a redistribution layer 622, a redistribution layer 632 including a shield layer 634, and a plurality of vias 640, 642, and 644. Sensor package 600 may also include a capacitor(s) similarly as included in sensor package 400 of FIG. 4.

The redistribution layer 622 may be on an insulating layer 623, and vias 640 may extend through the insulating layer 623. The redistribution layer 632 may be on an insulating layer 633, and vias 642 may extend through the insulating layer 633. The redistribution layer 624 may be on an insulating layer 625, and the vias 644 may extend through the insulating layer 625. The redistribution layer 626 may be on an insulating layer 627. The redistribution layer 624 includes transmit lines 612 of the fingerprint sensor 610, and redistribution layer 626 includes receive lines 614 of the fingerprint sensor 610 perpendicular to the transmit lines 612. In some examples, the transmit lines 612 may have a width of about 55 micrometers and a pitch of about 70 micrometers, and the receive lines 614 may have a width of about 5 micrometers and a pitch of about 75 micrometers.

The land grid array layer 602 is on/encapsulated by an insulating layer 603. Contacts of the sensing die 604 and contacts of the secure element die 606 face the fingerprint sensor 610 and face away from the land grid array layer 602. The sensing die 604 and secure element die 606 are arranged on the redistribution layer 622 with the contacts of the sensing die 604 and secure element die 606 facing the redistribution layer 622. The land grid array layer 602 is electrically coupled to the sensing die 604 and/or the secure element die 606 through vias 616, redistribution layer 622, and vias 618. The sensing die 604 is also electrically coupled to the fingerprint sensor (i.e., to each transmit line 612 and each receive line 614) through the redistribution layers 622, 632, 624, and 626 and vias 618, 640, 642, and 644. The secure element die 606 is electrically coupled to the sensing die 604 through corresponding vias 618 and redistribution layer 622.

The shield layer 634 in the redistribution layer 632 is between the fingerprint sensor 610 and the sensor die 604 and secure element die 606. Shield layer 634 may include a metal plate or metal grid to the shield sensing die 604 and secure element die 606 from electromagnetic interference from fingerprint sensor 610 and/or external sources.

The mold material 620 encapsulates the sensing die 604, secure element die 606, via 616, and vias 618. The land grid array layer 602, the fingerprint sensor 610, and the mold material 620 may each include a common footprint. In some examples, sensor package 600 may have a thickness as indicated at 630 less than or equal to 450 micrometers.

While one via 616 is illustrated in FIG. 6, sensor package 600 may include as many as 15 vias or more extending from the land grid array layer 602 to the redistribution layer 622 through the mold material 620 to electrically couple the sensing die 604 and/or the secure element die 606 to the land grid array layer 602. Compared to sensor package 400 of FIG. 4, the sensor package 600 of FIG. 6 may be easier to fabricate since sensor package 600 includes far fewer vias 616 compared to vias 416 included in sensor package 400.

In some examples, the sensing die 604 may have a width of about 3 millimeters and a length of about 4 millimeters. The sensing die 604 may include a Field Programmable Gate Array (FPGA), a system-on-chip (SOC), or another suitable logic circuit for operating fingerprint sensor 610. In some examples, the secure element die 606 may have a width of about 2 millimeters and a length of about 2 millimeters. The secure element die 606 includes suitable logic for performing cryptographic functions. In other examples, the sensing die 604 and the secure element die 606 may be combined into a single die.

Figure 7:
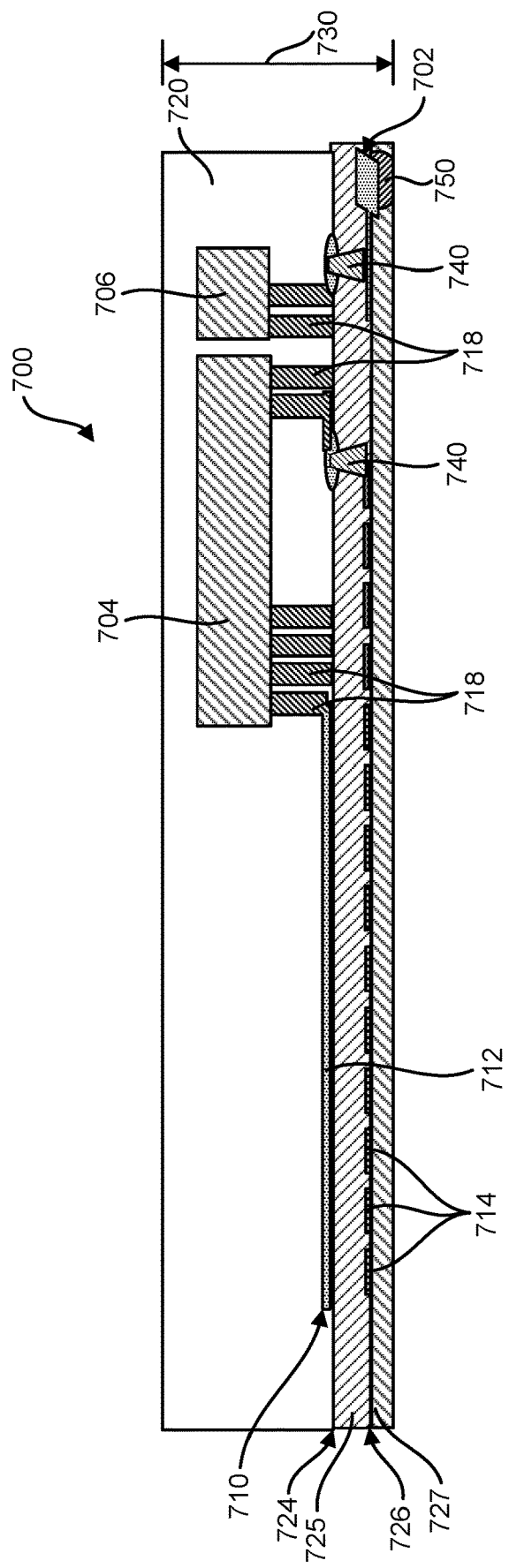
FIG. 7 illustrates a simplified cross-sectional view of yet another example of a sensor package.

FIG. 7 illustrates a simplified cross-sectional view of yet another example of a sensor package 700. In one example, sensor package 700 may provide sensor package 100 previously described and illustrated with reference to FIGS. 1A-3. Sensor package 700 includes a land grid array layer 702, a sensing die 704, a secure element die 706, a fingerprint sensor 710, a plurality of vias 718 (e.g., metal pillars), a mold material 720 (e.g., polymer), a plurality of vias 740, and a plurality of contacts 750. Sensor package 700 may also include a capacitor(s) similarly as included in sensor package 400 of FIG. 4.

Fingerprint sensor 710 includes a redistribution layer 724 and a redistribution layer 726. Redistribution layer 726 may include the land grid array layer 702. Redistribution layer 726 is over an insulating layer 727. Contacts 750 (e.g., solder balls) extend through the insulating layer 727 and are electrically coupled to the land grid array layer 702. The redistribution layer 724 may be on an insulating layer 725, and vias 740 may extend through the insulating layer 725. The redistribution layer 724 includes transmit lines 712 of the fingerprint sensor 710, and redistribution layer 726 includes receive lines 714 of the fingerprint sensor 710 perpendicular to the transmit lines 712. In some examples, the transmit lines 712 may have a width of about 55 micrometers and a pitch of about 70 micrometers, and the receive lines 714 may have a width of about 5 micrometers and a pitch of about 75 micrometers.

The sensing die 704 and secure element die 706 are arranged on redistribution layer 724 with the contacts of the sensing die 704 and secure element die 706 facing the fingerprint sensor 710 and the land grid array layer 702. The fingerprint sensor 710 is laterally offset with respect to the sensing die 704 and/or secure element die 706. The land grid array layer 702 is electrically coupled to the sensing die 704 and/or the secure element die 706 through the redistribution layers 726 and 724 and vias 718 and 740. The sensing die 704 is electrically coupled to the fingerprint sensor 710 (i.e., to each transmit line 712 and each receive line 714) through the redistribution layers 724 and 726 and vias 718 and 740. The secure element die 706 is electrically coupled to the sensing die 704 through corresponding vias 718 and redistribution layer 724.

The mold material 720 encapsulates the sensing die 704, secure element die 706, and vias 718. The land grid array layer 702, the fingerprint sensor 710, and the mold material 720 may each include a common footprint. In some examples, sensor package 700 may have a thickness as indicated at 730 less than or equal to 450 micrometers.

Compared to sensor package 400 of FIG. 4, sensor package 500 of FIG. 5, and sensor package 600 of FIG. 6, the sensor package 700 of FIG. 7 may be easier to fabricate since sensor package 700 does not include any vias 416, 516, or 616 extending through the mold material 420, 520, and 620, respectively. In addition, sensor package 700 of FIG. 7 includes two redistribution layers instead of the four redistribution layers of sensor packages 400, 500, and 600. Sensor package 700 may, however, have a wider area than sensor packages 400, 500, and 600.

In some examples, the sensing die 704 may have a width of about 3 millimeters and a length of about 4 millimeters. The sensing die 704 may include a Field Programmable Gate Array (FPGA), a system-on-chip (SOC), or another suitable logic circuit for operating fingerprint sensor 710. In some examples, the secure element die 706 may have a width of about 2 millimeters and a length of about 2 millimeters. The secure element die 706 includes suitable logic for performing cryptographic functions. In other examples, the sensing die 704 and the secure element die 706 may be combined into a single die.

Figure 8:
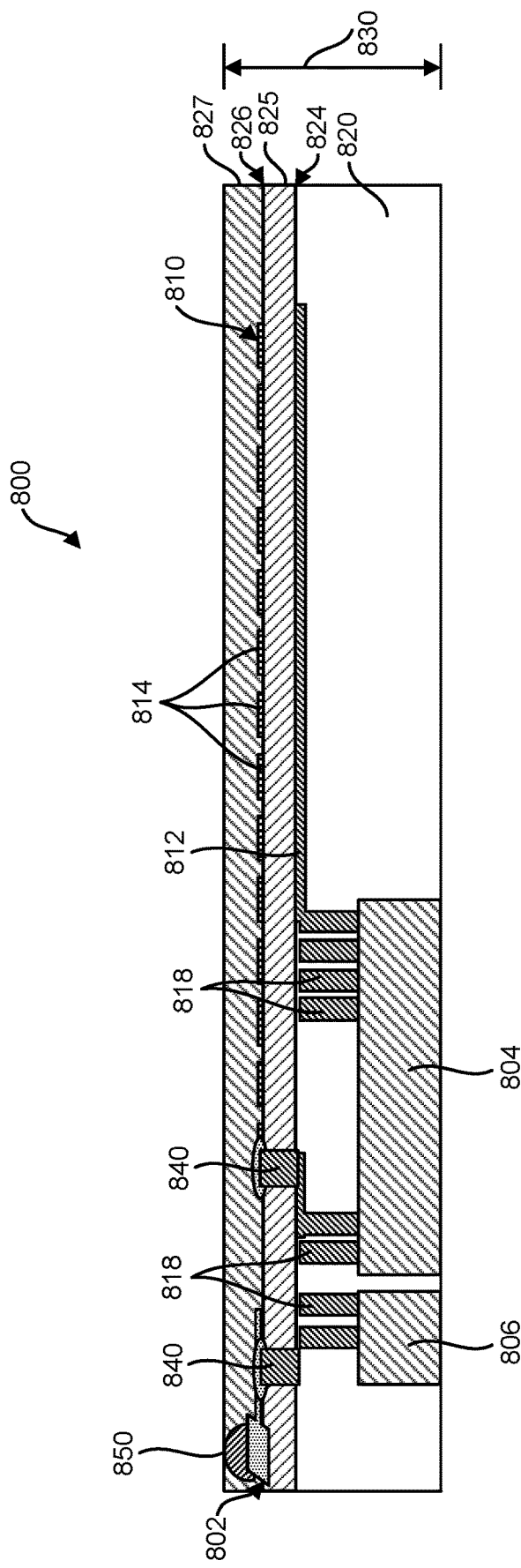
FIG. 8 illustrates a simplified cross-sectional view of yet another example of a sensor package.

FIG. 8 illustrates a simplified cross-sectional view of yet another example of a sensor package 800. In one example, sensor package 800 may provide sensor package 100 previously described and illustrated with reference to FIGS. 1A-3. Sensor package 800 includes a land grid array layer 802, a sensing die 804, a secure element die 806, a fingerprint sensor 810, a plurality of vias 818 (e.g., metal pillars), a mold material 820 (e.g., polymer), a plurality of vias 840, and a plurality of contacts 850. Sensor package 800 may also include a capacitor(s) similarly as included in sensor package 400 of FIG. 4.

Fingerprint sensor 810 includes a redistribution layer 824 and a redistribution layer 826. Redistribution layer 826 may include the land grid array layer 802. The redistribution layer 824 may be covered/encapsulated by an insulating layer 825, and the vias 840 may extend through the insulating layer 825. The redistribution layer 826 may be covered/encapsulated by an insulating layer 827, and contacts (e.g., solder balls) extend through the insulating layer 827 and are electrically coupled to the land grid array layer 802. The redistribution layer 824 includes transmit lines 812 of the fingerprint sensor 810, and redistribution layer 826 includes receive lines 814 of the fingerprint sensor 810 perpendicular to the transmit lines 812. In some examples, the transmit lines 812 may have a width of about 55 micrometers and a pitch of about 70 micrometers, and the receive lines 814 may have a width of about 5 micrometers and a pitch of about 75 micrometers.

The sensing die 804 and secure element die 806 are arranged with the contacts of the sensing die 804 and secure element die 806 facing the fingerprint sensor 810 and the land grid array layer 802. The fingerprint sensor 810 is laterally offset with respect to the sensing die 804 and/or secure element die 806. The land grid array layer 802 is electrically coupled to the sensing die 804 and/or the secure element die 806 through the redistribution layers 826 and 824 and vias 840 and 818. The sensing die 804 is electrically coupled to the fingerprint sensor 810 (i.e., to each transmit line 812 and each receive line 814) through the redistribution layers 824 and 826 and vias 818 and 840. The secure element die 806 is electrically coupled to the sensing die 804 through corresponding vias 818 and redistribution layer 824.

The mold material 820 encapsulates the sensing die 804, secure element die 806, and vias 818. The land grid array layer 802, the fingerprint sensor 810, and the mold material 820 may each include a common footprint. In some examples, sensor package 800 may have a thickness as indicated at 830 less than or equal to 450 micrometers.

Compared to sensor package 400 of FIG. 4, sensor package 500 of FIG. 5, and sensor package 600 of FIG. 6, the sensor package 800 of FIG. 8 may be easier to fabricate since sensor package 800 does not include any via 416, 516, or 616 extending through the mold material 420, 520, and 620, respectively. In addition, sensor package 800 of FIG. 8 includes two redistribution layers instead of the four redistribution layers of sensor packages 400, 500, and 600. Sensor package 800 may, however, have a wider area than sensor packages 400, 500, and 600.

In some examples, the sensing die 804 may have a width of about 3 millimeters and a length of about 4 millimeters. The sensing die 804 may include a Field Programmable Gate Array (FPGA), a system-on-chip (SOC), or another suitable logic circuit for operating fingerprint sensor 810. In some examples, the secure element die 806 may have a width of about 2 millimeters and a length of about 2 millimeters. The secure element die 806 includes suitable logic for performing cryptographic functions. In other examples, the sensing die 804 and the secure element die 806 may be combined into a single die.

Figure 9A:
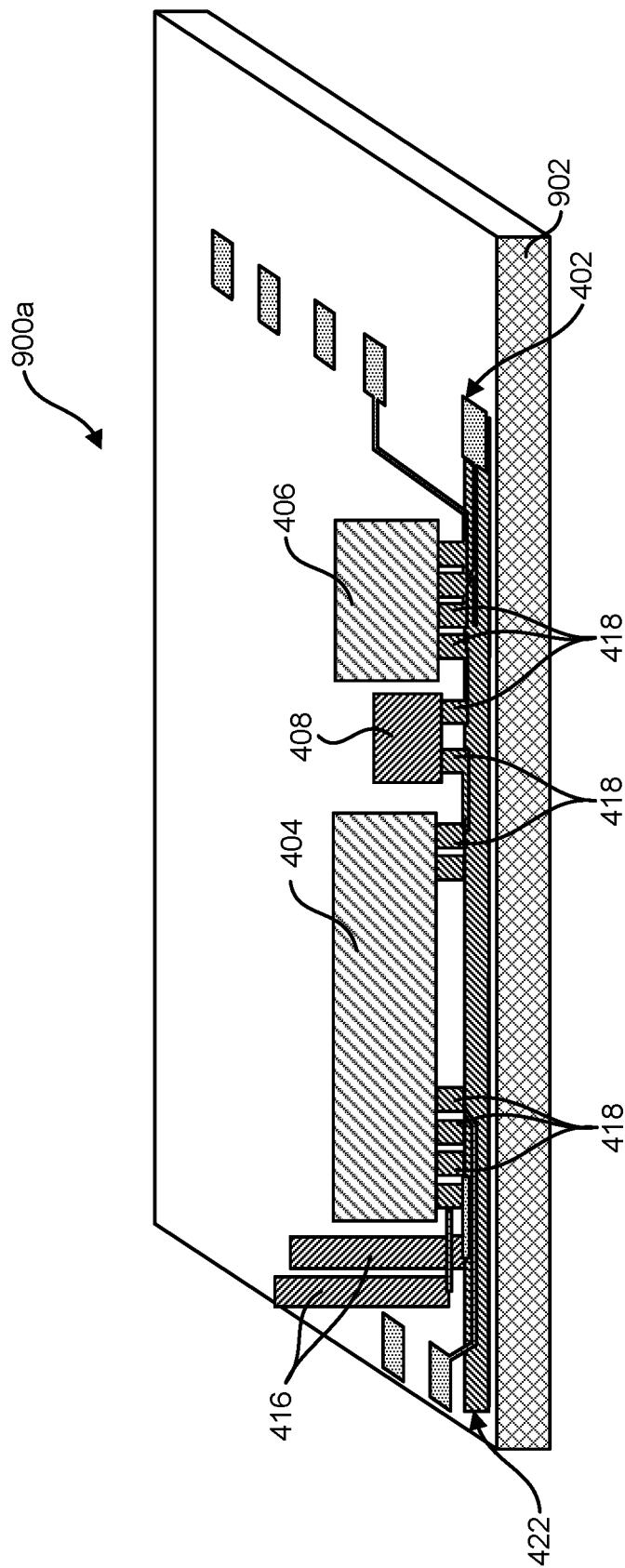
FIGS. 9A-9C illustrate an example method for fabricating the sensor package of FIG. 4.
Figure 9B:
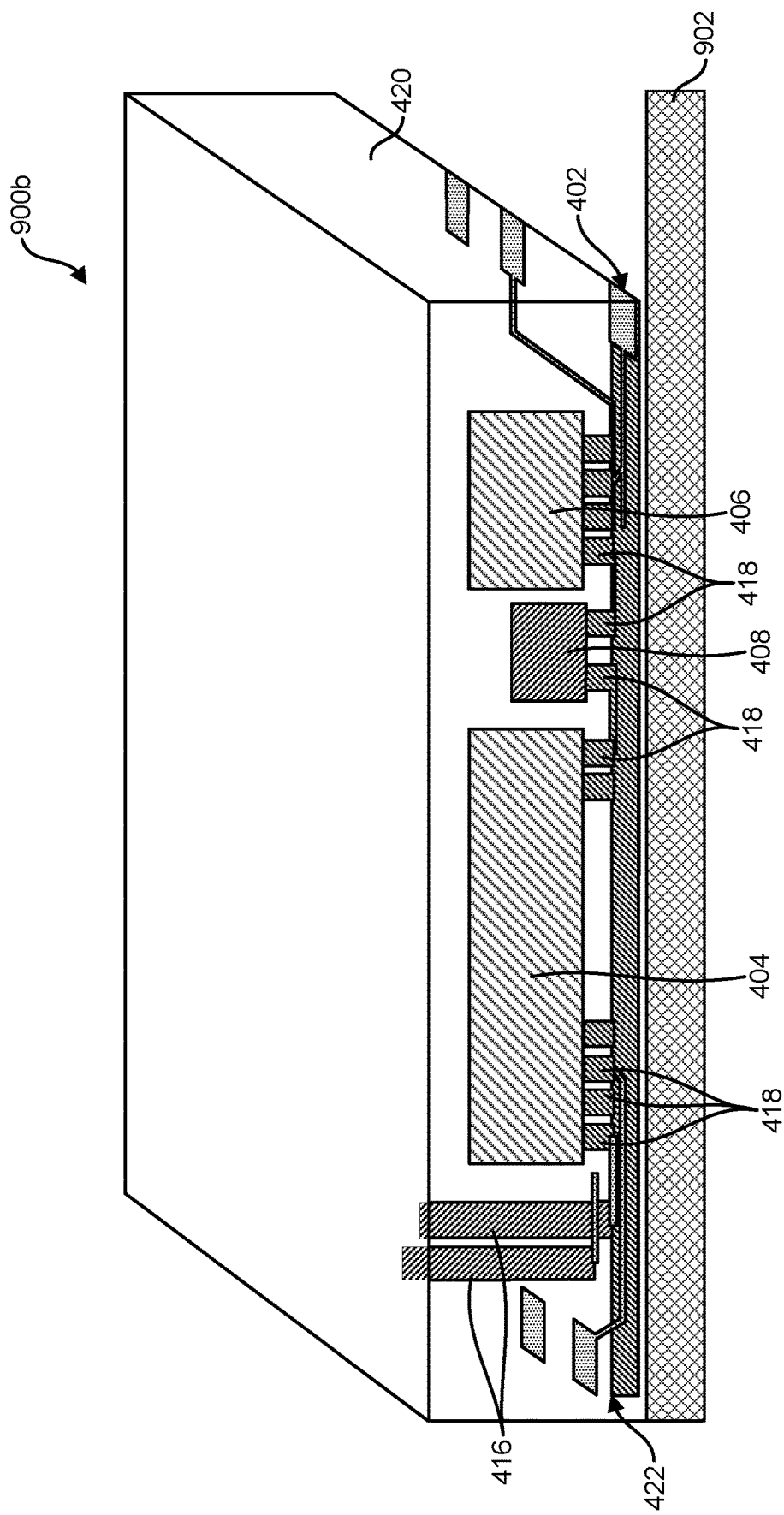
Figure 9C:
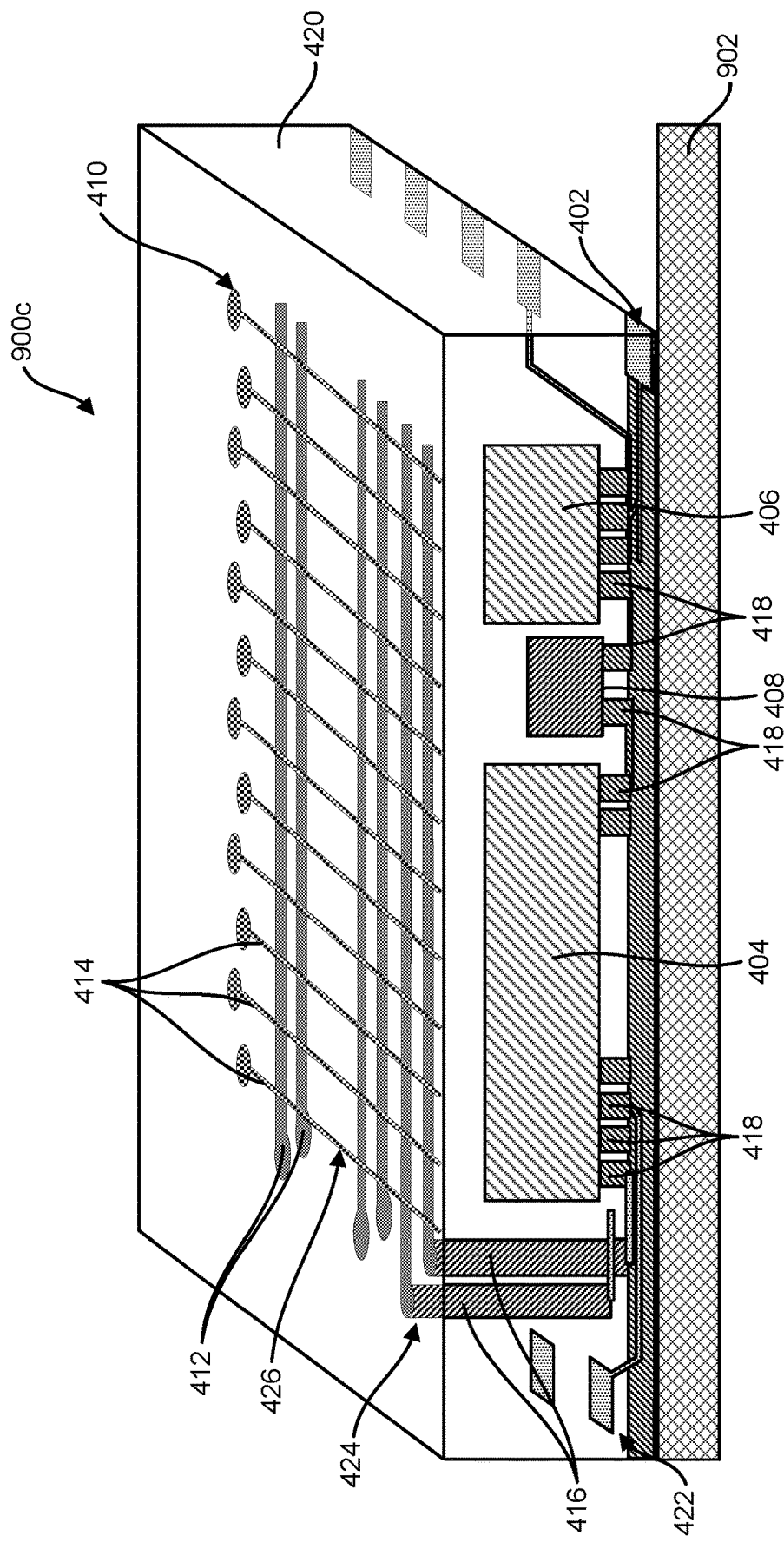

FIGS. 9A-9C illustrate an example method for fabricating the sensor package 400 of FIG. 4. As illustrated in FIG. 9A at 900a, a land grid array layer 402 may be formed on a temporary carrier 902. A redistribution layer 422 may then be formed on the land grid array layer 402 and electrically coupled to the land grid array layer 402. A sensing die 404 with metal pillars 418 (e.g., copper pillars) electrically connected to contacts of the sensing die 404, a secure element die 406 with metal pillars 418 electrically coupled to contacts of the secure element die 406, and a capacitor 408 with metal pillars 418 electrically coupled to contacts of the capacitor 408, and via posts 416 (e.g., metal columns) may then be electrically coupled to the redistribution layer 422.

As illustrated in FIG. 9B at 900b, the sensing die 404, secure element die 406, capacitor 408, metal pillars 418, and via posts 416 may then be encapsulated within a mold material 420 such that the top of each via post 416 is exposed at the top surface of the mold material 420.

As illustrated in FIG. 9C at 900c, a redistribution layer 424 may be formed on the mold material 420 and electrically coupled to corresponding via posts 416. The redistribution layer 424 includes the transmit lines 412 of the fingerprint sensor 410. An insulating layer may be applied over the redistribution layer 424. A redistribution layer 426 may then be formed over the insulating layer and redistribution layer 424 and electrically coupled to corresponding via posts 416. The redistribution layer 426 includes receive lines 414 of the fingerprint sensor 410. Another insulating layer may then be coated over the redistribution layer 426. The temporary carrier 902 may then be removed to complete the fabrication of the sensor package 400 as previously described and illustrated with reference to FIG. 4.

FIGS. 10A-10D illustrate an example method for fabricating the sensor package 500 of FIG. 5. As illustrated in the simplified cross-sectional view of FIG. 10A at 1000a, a land grid array layer 502 may be formed on a temporary carrier 1002. An insulating layer 503 may then be applied over the land grid array layer 502. Via posts 516 (e.g., metal columns) may be electrically coupled to the land grid array layer 502 through vias in the insulating layer 503. A sensing die 504, including metal pillars 518 (e.g., copper pillars) electrically coupled to contacts of the sensing die 504, and a secure element die 506, including metal pillars 518 electrically coupled to contacts of the secure element die 506, may then be arranged on the insulating layer 503 with the contacts of the sensing die 504 and the contacts of the secure element die 506 facing away from the land grid array layer 502.

Figure 10A:
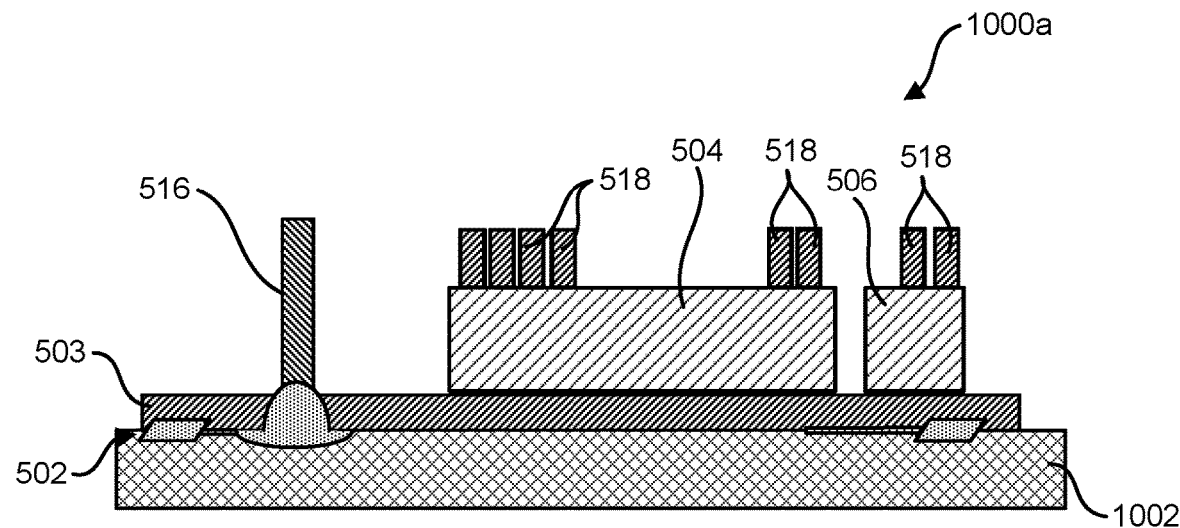
FIGS. 10A-10D illustrate an example method for fabricating the sensor package of FIG. 5.
Figure 10B:
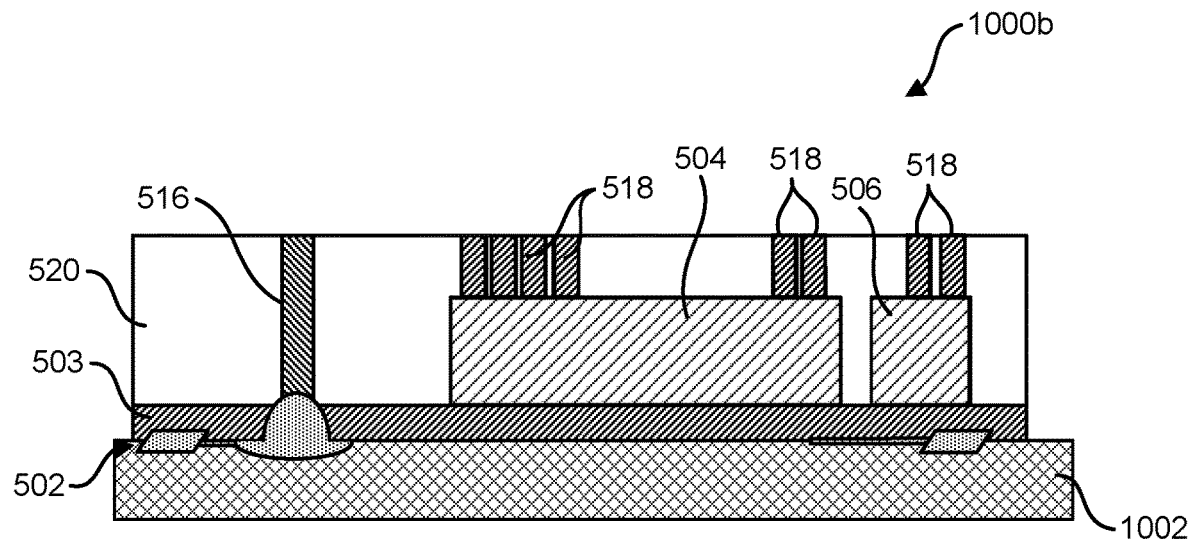

As illustrated in the simplified cross-sectional view of FIG. 10B at 1000b, the sensing die 504, secure element die 506, via posts 516, and metal pillars 518 may then be encapsulated with a mold material 520 such that the top of each via post 516 and the top of each metal pillar 518 is exposed at the top surface of the mold material 520.

Figure 10C:
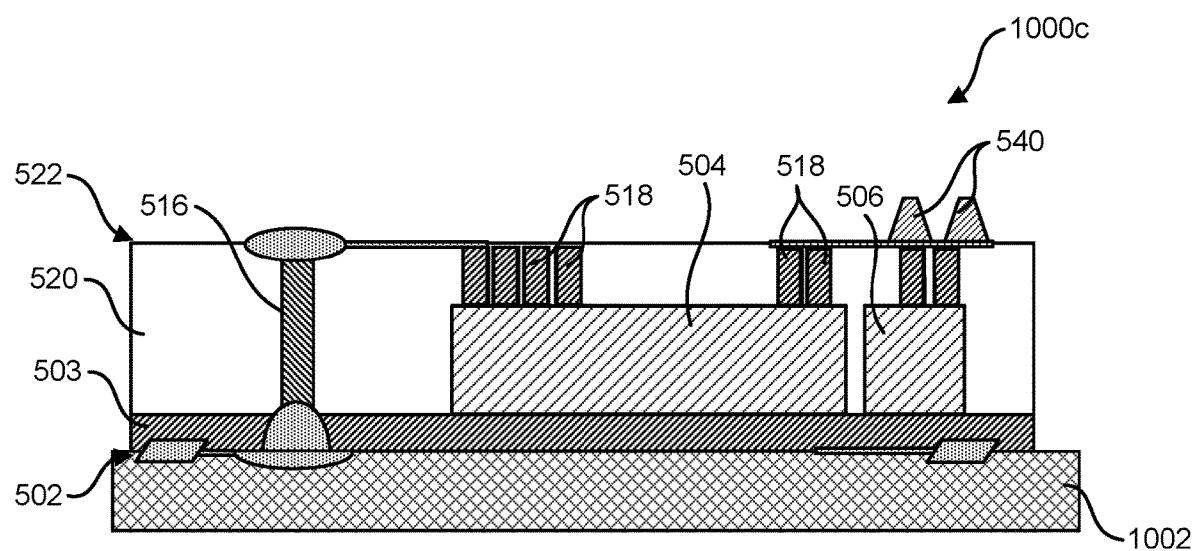

As illustrated in the simplified cross-sectional view of FIG. 10C at 1000c, a redistribution layer 522 may then be formed on the mold material 520 and electrically coupled to the metal pillars 518 and via posts 516. Vias 540 may then be formed on redistribution layer 522 and electrically coupled to redistribution layer 522.

Figure 10D:
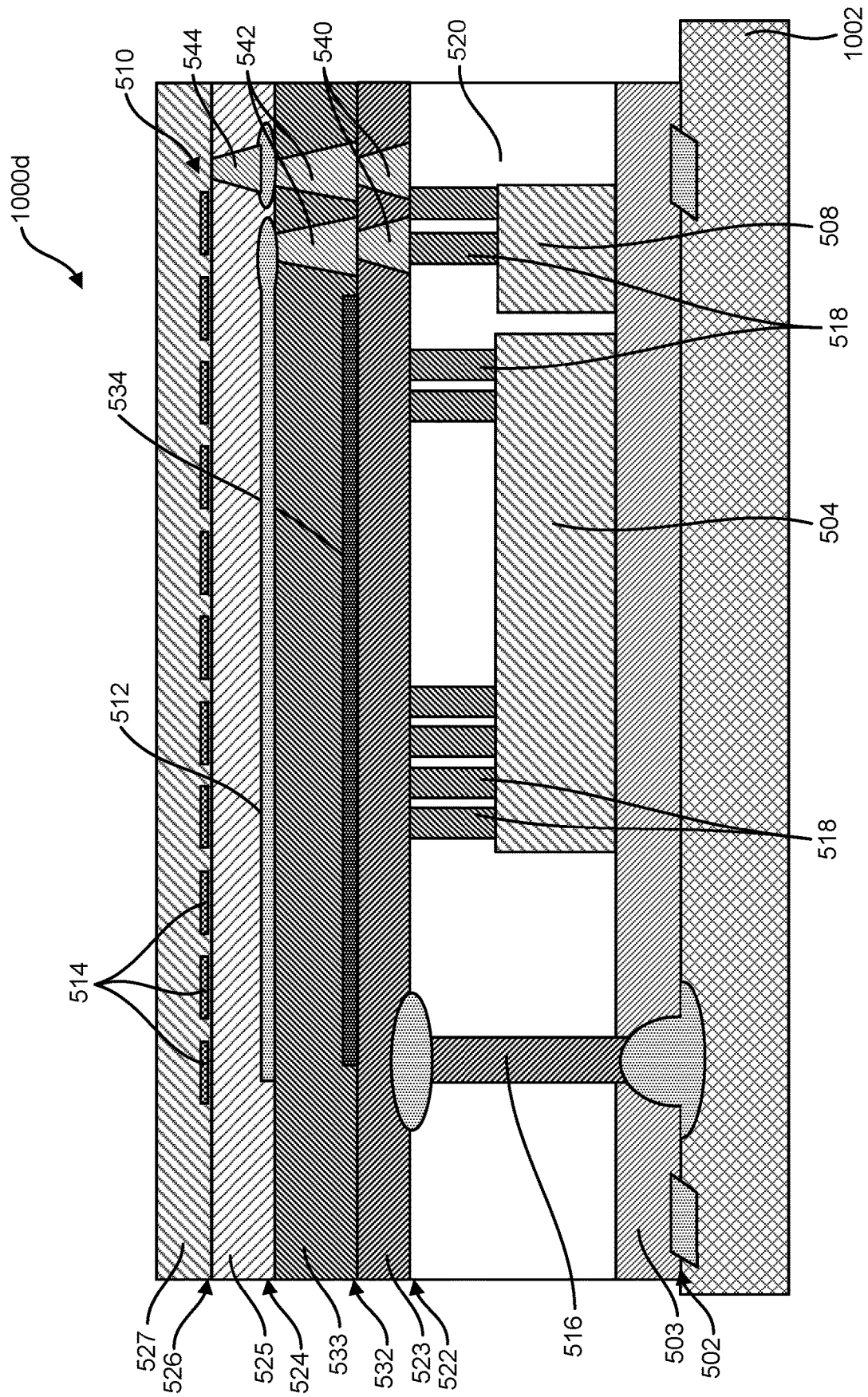

As illustrated in the simplified cross-sectional view of FIG. 10D at 1000d, an insulating layer 523 may be formed over redistribution layer 522 encapsulating vias 540 such that the top of each via 540 is exposed at the top surface of the insulating layer 523. A redistribution layer 532 including a shield layer 534 may be formed on the insulating layer 523 and electrically coupled to the vias 540. Vias 542 may then be formed on redistribution layer 532 and electrically coupled to redistribution layer 532. An insulating layer 533 may be formed over redistribution layer 532 such that the top of each via 542 is exposed on the top surface of the insulating layer 533. A redistribution layer 524 including transmit lines 512 may be formed on the insulating layer 533 and electrically coupled to the vias 542. Vias 544 may then be formed on redistribution layer 524 and electrically coupled to redistribution layer 524. An insulating layer 525 may be formed over redistribution layer 524 such that the top of each via 544 is exposed at the top surface of the insulating layer 525. A redistribution layer 526 including receive lines 514 may be formed on the insulating layer 525 and electrically coupled to the vias 544. An insulating layer 527 may be formed over redistribution layer 526 to protect the fingerprint sensor 510. In some examples, insulating layers 523, 533, and 525 may be formed prior to forming vias 540, 542, and 544 through the insulating layers 523, 533, and 525, respectively. The temporary carrier 1002 may then be removed to complete the fabrication of the sensor package 500 as previously described and illustrated with reference to FIG. 5.

FIGS. 11A-11D illustrate an example method for fabricating the sensor package 600 of FIG. 6. As illustrated in the simplified cross-sectional view of FIG. 11A at 1100a, an insulating layer 627 may be applied over a temporary carrier 1102. A redistribution layer 626 including receive lines 614 may be formed on the insulating layer 627. Vias 644 may then be formed on redistribution layer 626 and electrically coupled to redistribution layer 626. An insulating layer 625 may be formed over redistribution layer 626 such that the top of each via 644 is exposed at the top surface of the insulating layer 625. A redistribution layer 624 including transmit lines 612 may be formed on the insulating layer 625 and electrically coupled to the vias 644. Vias 642 may then be formed on redistribution layer 624 and electrically coupled to redistribution layer 624.

Figure 11A:
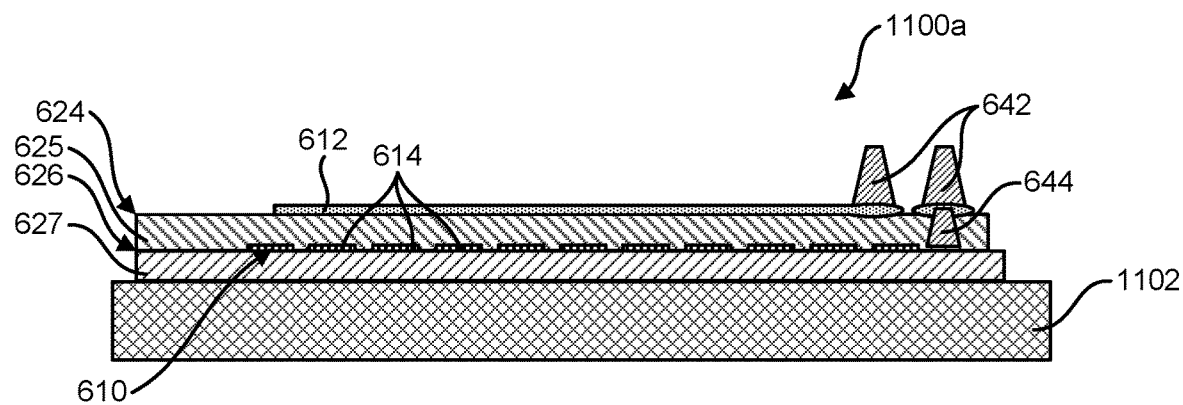
FIGS. 11A-11D illustrate an example method for fabricating the sensor package of FIG. 6.
Figure 11B:
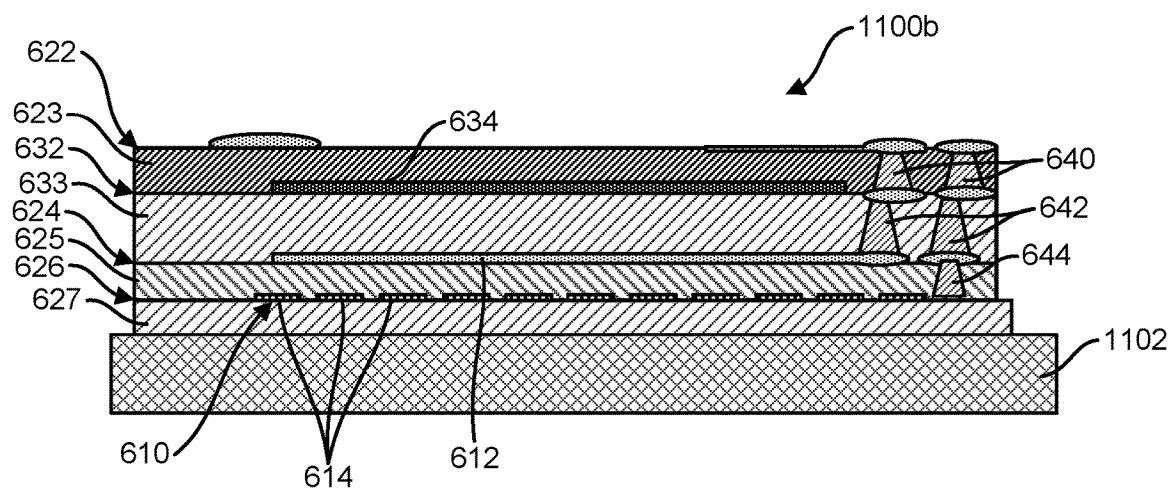

As illustrated in the simplified cross-sectional view of FIG. 11B at 1100b, an insulating layer 633 may be formed over redistribution layer 624 such that the top of each via 642 is exposed at the top surface of the insulating layer 633. A redistribution layer 632 including a shield layer 634 may be formed on the insulating layer 633 and electrically coupled to the vias 642. Vias 640 may then be formed on redistribution layer 632 and electrically coupled to redistribution layer 632. An insulating layer 623 may be formed over redistribution layer 632 such that the top of each via 640 is exposed at the top surface of the insulating layer 623. A redistribution layer 622 may then be formed on the insulating layer 623 and electrically coupled to the vias 640.

Figure 11C:
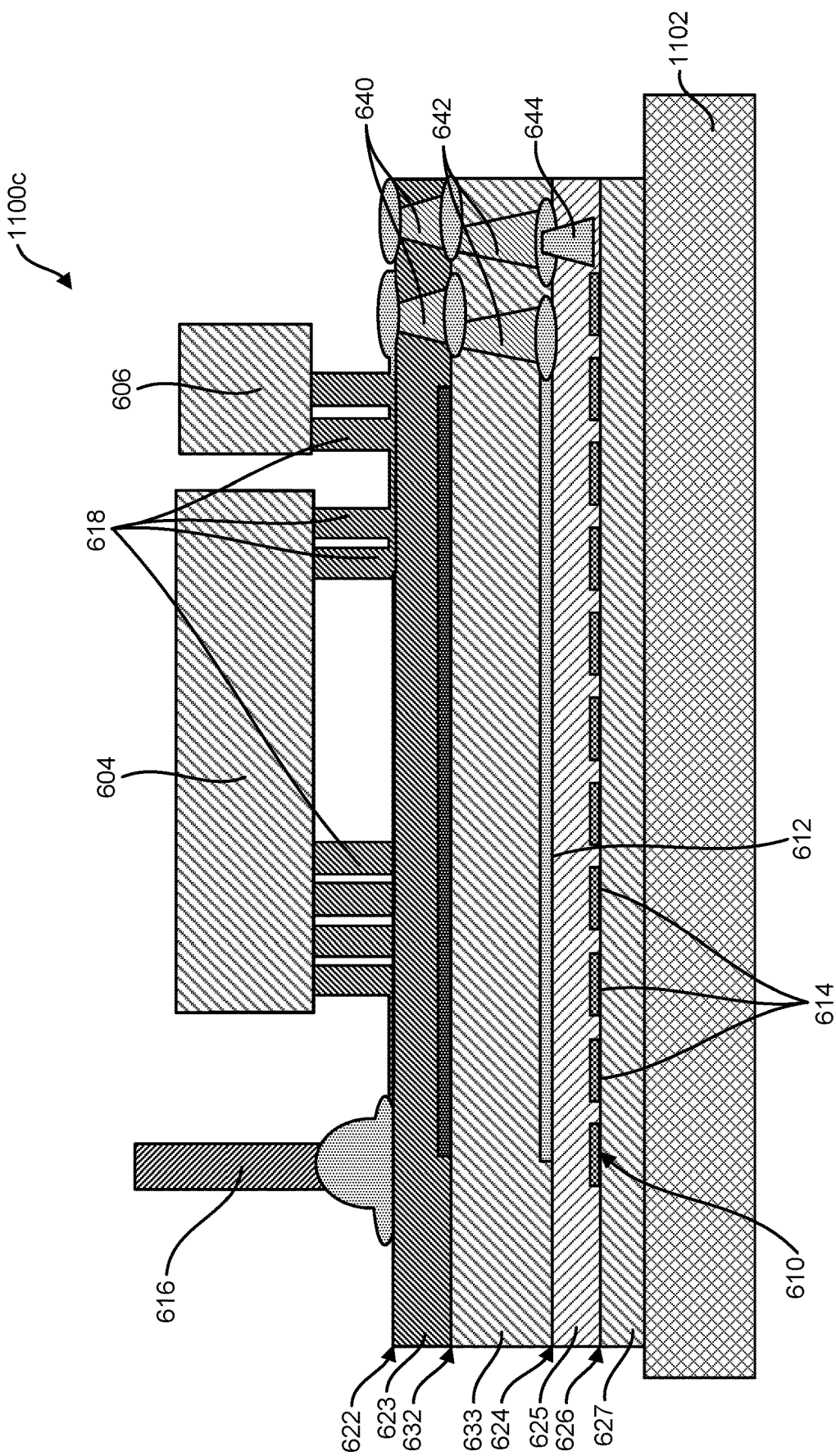

As illustrated in the simplified cross-sectional view of FIG. 11C at 1100c, a sensing die 604, including metal pillars 618 (e.g., copper pillars) electrically coupled to contacts of the sensing die 604, a secure element die 606, including metal pillars 618 electrically coupled to contacts of the secure element die 606, and via posts 616 (e.g., metal columns) may then be electrically coupled to the redistribution layer 622 with the contacts of the sensing die 604 and the secure element die 606 facing the fingerprint sensor 610.

Figure 11D:
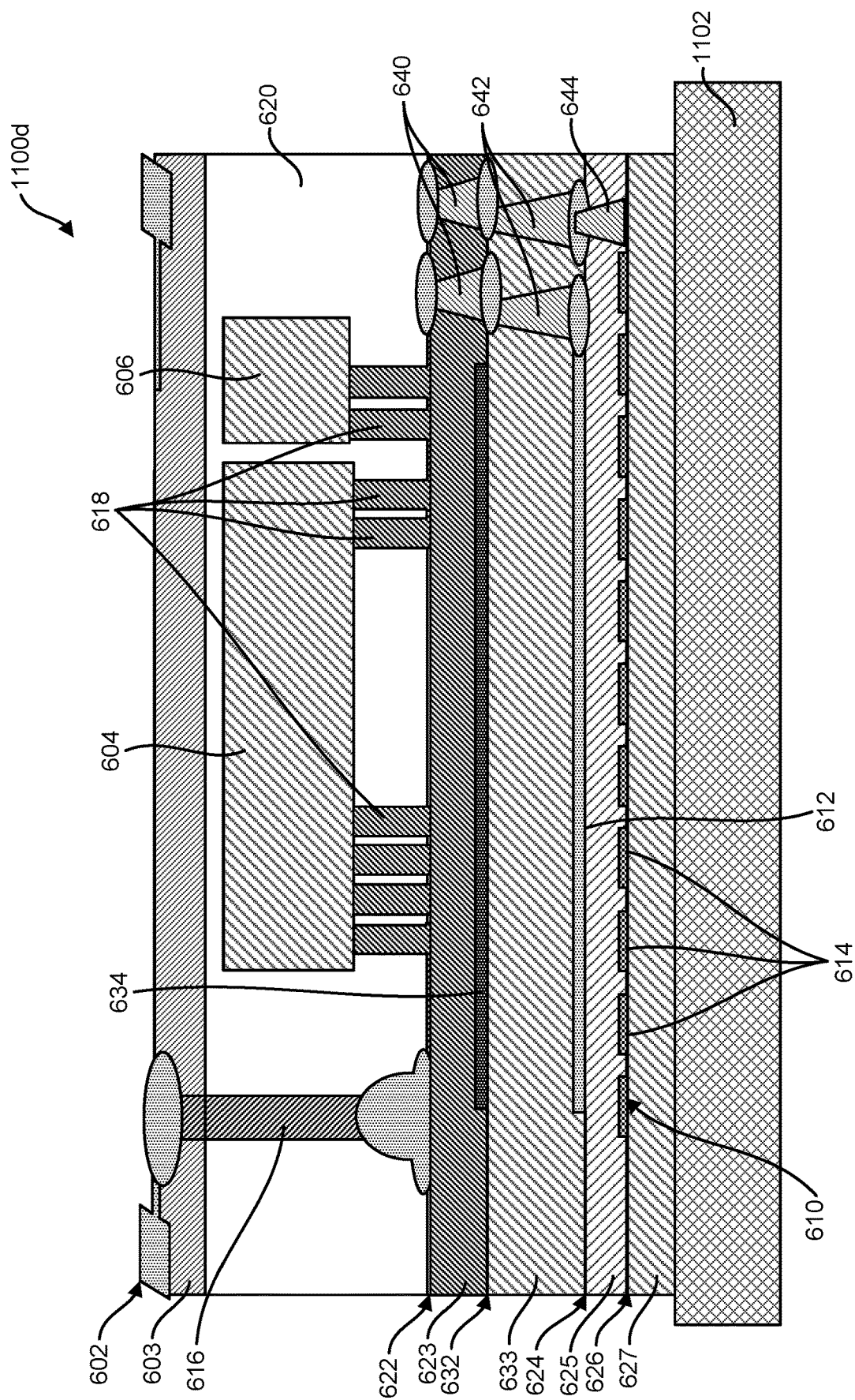

As illustrated in the simplified cross-sectional view of FIG. 11D at 1100d, the sensing die 604, secure element die 606, via posts 616, and metal pillars 618 are then encapsulated with a mold material 620 such that the top of each via post 616 is exposed at the top surface of the mold material 620. An insulating layer 603 may be formed over the mold material 620, and a land grid array layer 602 may then be formed on the insulating layer 603 and electrically coupled to the via posts 616. The temporary carrier 1102 may then be removed to complete the fabrication of the sensor package 600 as previously described and illustrated with reference to FIG. 6.

Figure 12A:
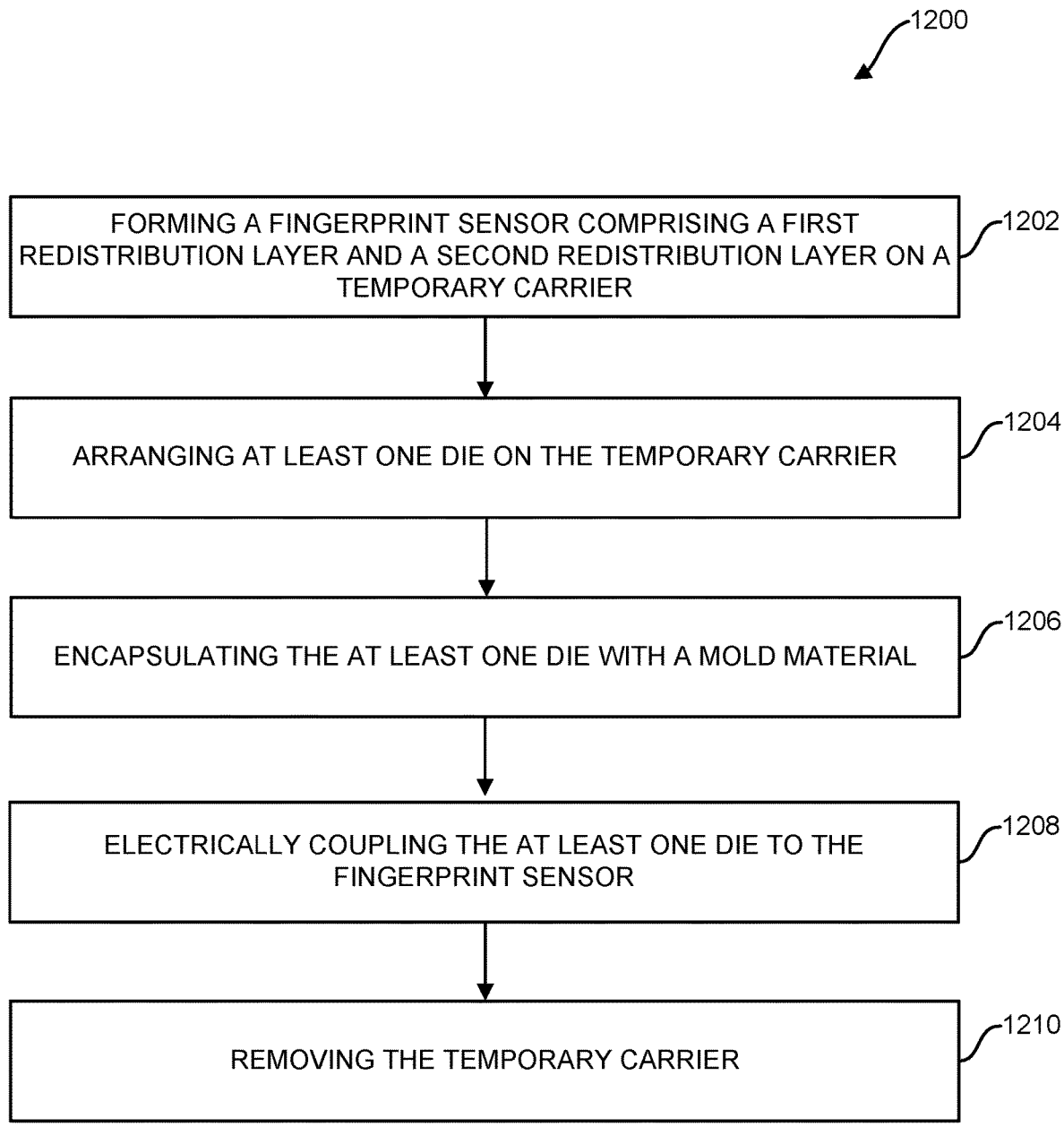
FIGS. 12A-12F are flow diagrams illustrating one example of a method for fabricating a sensor package.

FIGS. 12A-12F are flow diagrams illustrating one example of a method 1200 for fabricating a sensor package, such as sensor package 100 of FIGS. 1A-1B, sensor package 400 of FIG. 4, sensor package 500 of FIG. 5, sensor package 600 of FIG. 6, sensor package 700 of FIG. 7, or sensor package 800 of FIG. 8. As illustrated in FIG. 12A at 1202, method 1200 includes forming a fingerprint sensor comprising a first redistribution layer (e.g., 426, 526, 626, 726, 826) and a second redistribution layer (e.g., 424, 524, 624, 724, 824) on a temporary carrier (e.g., 902, 1002, 1102). At 1204, method 1200 includes arranging at least one die (e.g., 404, 504, 604, 704, 804) on the temporary carrier. At 1206, method 1200 includes encapsulating the at least one die with a mold material (e.g., 420, 520, 620, 720, 820). At 1208, method 1200 includes electrically coupling the at least one die to the fingerprint sensor. At 1210, method 1200 includes removing the temporary carrier.

Figure 12B:
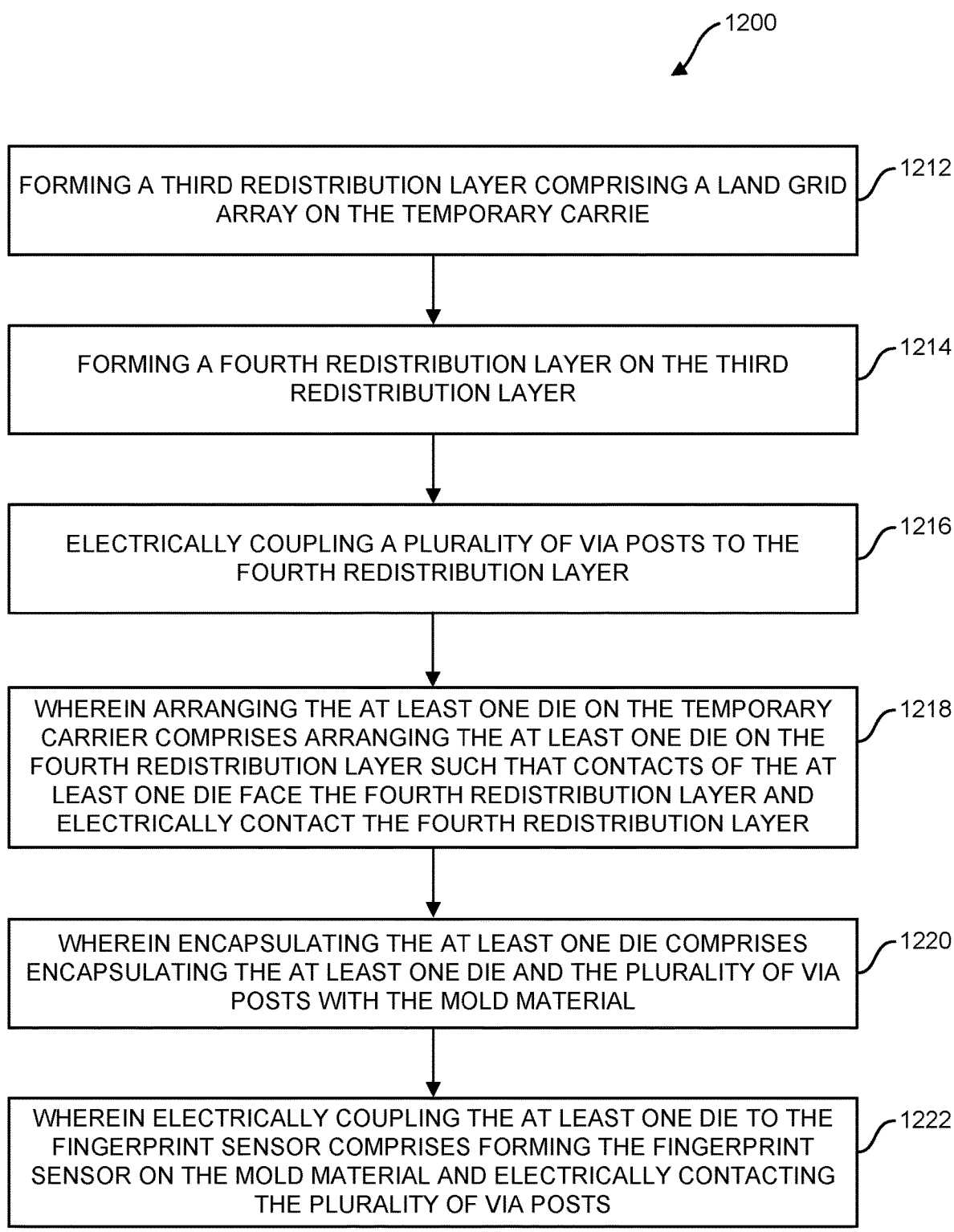

As illustrated in FIG. 12B at 1212, method 1200 may further include forming a third redistribution layer (e.g., 402, 502, 602) comprising a land grid array (e.g., 402, 502, 602) on the temporary carrier. At 1214, method 1200 may further include forming a fourth redistribution layer (e.g., 422, 522, 622) on the third redistribution layer. At 1216, method 1200 may further include electrically coupling a plurality of via posts (e.g., 416, 516, 616) to the fourth redistribution layer. At 1218, method 1200 may further include wherein arranging the at least one die (e.g., 404, 504, 604) on the temporary carrier comprises arranging the at least one die on the fourth redistribution layer such that contacts of the at least one die face the fourth redistribution layer and electrically contact the fourth redistribution layer. At 1220, method 1200 may further include wherein encapsulating the at least one die comprises encapsulating the at least one die and the plurality of via posts with the mold material (e.g., 420, 520, 620). At 1222, method 1200 may further include wherein electrically coupling the at least one die to the fingerprint sensor (e.g., 410, 510, 610) comprises forming the fingerprint sensor on the mold material and electrically contacting the plurality of via posts.

Figure 12C:
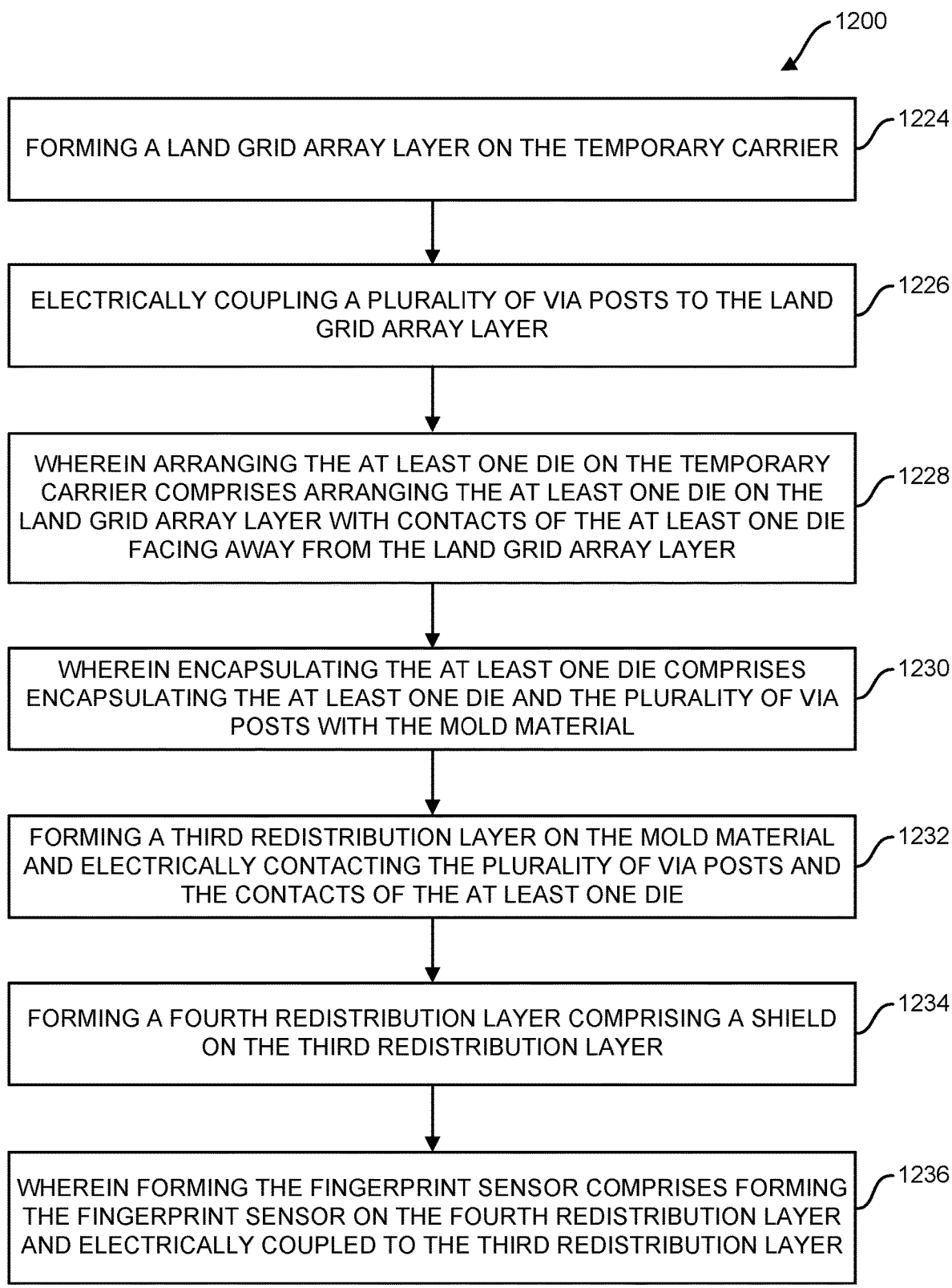

As illustrated in FIG. 12C at 1224, method 1200 may further include forming a land grid array layer (e.g., 502) on the temporary carrier (e.g., 1002). At 1226, method 1200 may further include electrically coupling a plurality of via posts (e.g., 516) to the land grid array layer. At 1228, method 1200 may further include wherein arranging the at least one die (e.g., 504) on the temporary carrier comprises arranging the at least one die on the land grid array layer with contacts of the at least one die facing away from the land grid array layer. At 1230, method 1200 may further include wherein encapsulating the at least one die comprises encapsulating the at least one die and the plurality of via posts with the mold material (e.g., 520). At 1232, method 1200 may further include forming a third redistribution layer (e.g., 522) on the mold material (e.g., 520) and electrically contacting the plurality of via posts and the contacts of the at least one die. At 1234, method 1200 may further include forming a fourth redistribution layer (e.g., 532) comprising a shield (e.g., 534) on the third redistribution layer. At 1236, method 1200 may further include wherein forming the fingerprint sensor (e.g., 510) comprises forming the fingerprint sensor on the fourth redistribution layer and electrically coupled to the third redistribution layer.

Figure 12D:
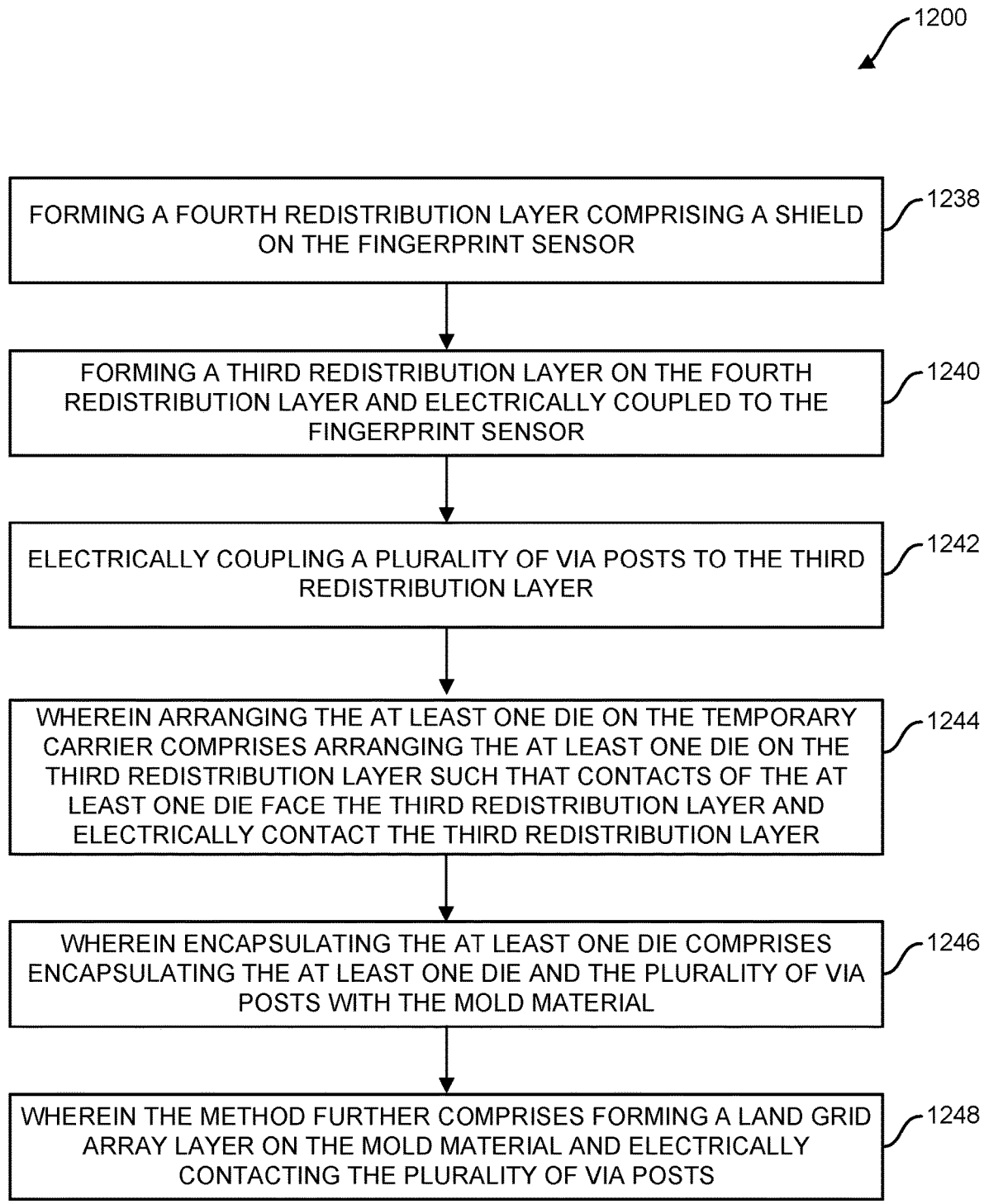

As illustrated in FIG. 12D at 1238, method 1200 may further include forming a fourth redistribution layer (e.g., 632) comprising a shield (e.g., 634) on the fingerprint sensor (e.g., 610). At 1240, method 1200 may further include forming a third redistribution layer (e.g., 622) on the fourth redistribution layer and electrically coupled to the fingerprint sensor. At 1242, method 1200 may further include electrically coupling a plurality of via posts (e.g., 616) to the third redistribution layer. At 1244, method 1200 may further include wherein arranging the at least one die (e.g., 604) on the temporary carrier (e.g., 1102) comprises arranging the at least one die on the third redistribution layer such that contacts of the at least one die face the third redistribution layer and electrically contact the third redistribution layer. At 1246, method 1200 may further include wherein encapsulating the at least one die comprises encapsulating the at least one die and the plurality of via posts with the mold material (e.g., 620). At 1248, method 1200 may further include wherein the method further comprises forming a land grid array layer (e.g., 602) on the mold material and electrically contacting the plurality of via posts.

Figure 12E:
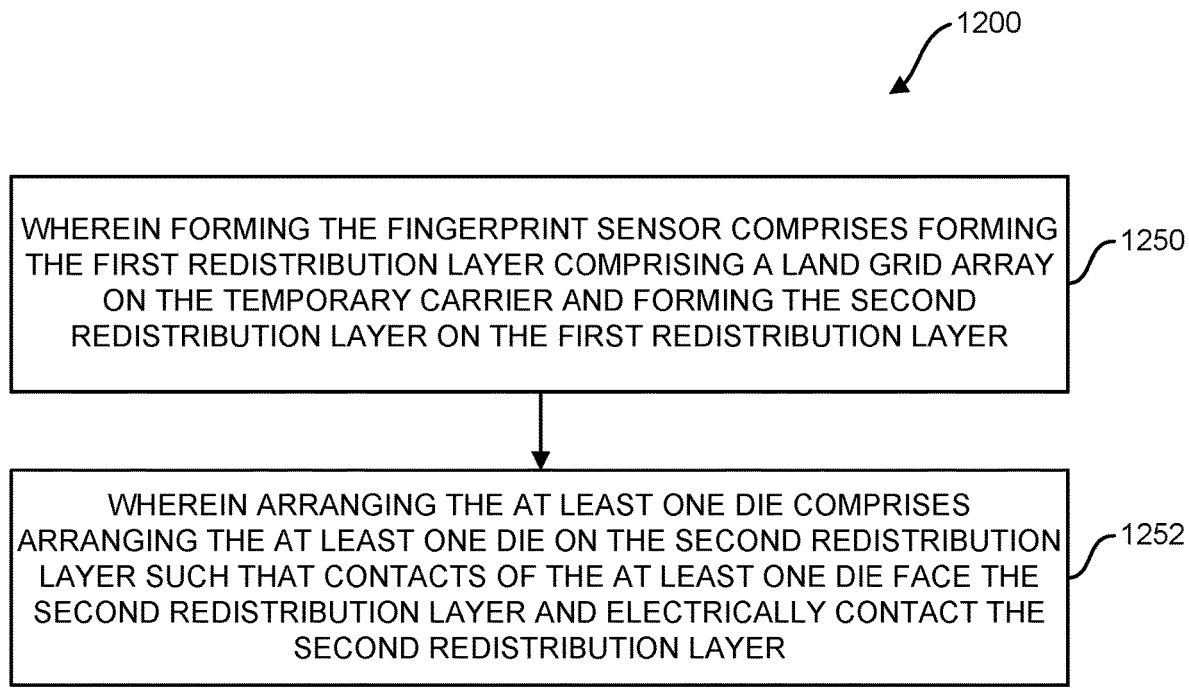

As illustrated in FIG. 12E at 1250, method 1200 may further include wherein forming the fingerprint sensor (e.g., 710) comprises forming the first redistribution layer (e.g., 726) comprising a land grid array (e.g., 702) on the temporary carrier and forming the second redistribution layer (e.g., 724) on the first redistribution layer. At 1252, method 1200 may further include wherein arranging the at least one die (e.g., 704) comprises arranging the at least one die on the second redistribution layer such that contacts of the at least one die face the second redistribution layer and electrically contact the second redistribution layer.

Figure 12F:
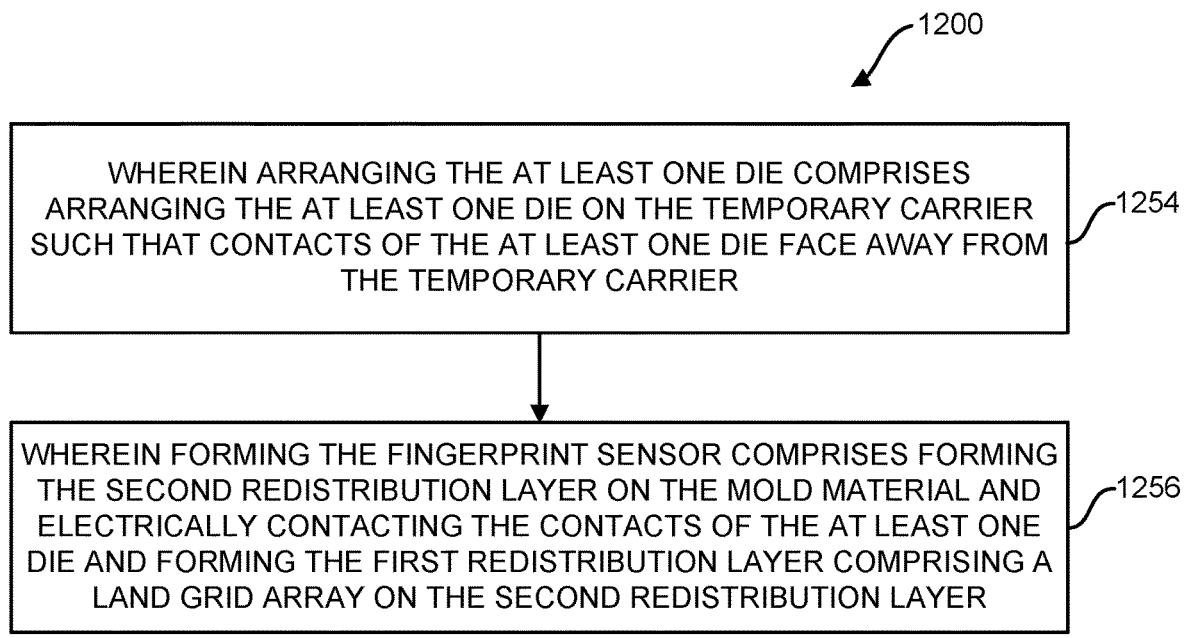

As illustrated in FIG. 12F at 1254, method 1200 may further include wherein arranging the at least one die (e.g., 804) comprises arranging the at least one die on the temporary carrier such that contacts of the at least one die face away from the temporary carrier. At 1256, method 1200 may further include wherein forming the fingerprint sensor (e.g., 810) comprises forming the second redistribution layer (e.g., 824) on the mold material (e.g., 820) and electrically contacting the contacts of the at least one die and forming the first redistribution layer (e.g., 826 comprising a land grid array (e.g., 802) on the second redistribution layer.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A sensor package comprising:
   a sensing die and a secure element die electrically coupled to the sensing die;
   a fingerprint sensor electrically coupled to the sensing die;
   a single mold material encapsulating both the sensing die and the secure element die; and
   a land grid array layer electrically coupled to the sensing die and the secure element die, the land grid array layer comprising a plurality of contacts exposed at a surface of the sensor package and configured to electrically couple to a corresponding plurality of contacts of a socket,
   wherein the land grid array layer, the fingerprint sensor, and the mold material each comprise a common footprint.

2. The sensor package of claim 1, wherein the sensor package comprises a thickness less than or equal to 450 micrometers.

3. The sensor package of claim 1, further comprising:
   a shield layer between the fingerprint sensor and the sensing die and the secure element die.

4. The sensor package of claim 1, further comprising:
   a plurality of vias extending through the mold material and electrically coupling the sensing die and the secure element die to the land grid array,
   wherein the sensing die and the secure element die each comprise contacts facing the fingerprint sensor and facing away from the land grid array.

5. The sensor package of claim 1, further comprising:
   a plurality of vias extending through the mold material and electrically coupling the sensing die and the secure element die to the fingerprint sensor,
   wherein the sensing die and the secure element die each comprise contacts facing away from the fingerprint sensor and facing the land grid array layer.

6. The sensor package of claim 1, wherein the land grid array layer comprises contacts at least partially aligned with the sensing die and/or the secure element die in a direction perpendicular to the land grid array layer.

7. The sensor package of claim 1, further comprising:
   at least one capacitor electrically coupled to the sensing die and/or the secure element die,
   wherein the mold material encapsulates the at least one capacitor.

8. The sensor package of claim 1, wherein the single mold material directly contacts both the sensing die and the secure element die.

9. The sensor package of claim 1, wherein the sensing die and the secure element die are within the common footprint.

10. A sensor package comprising:
    a sensing die and a secure element die electrically coupled to the sensing die;
    a fingerprint sensor comprising a first redistribution layer and a second redistribution layer, the fingerprint sensor electrically coupled to the sensing die and laterally offset with respect to the sensing die and/or the secure element die; and
    a single mold material encapsulating both the sensing die and the secure element die;
    wherein the first redistribution layer comprises a land grid array electrically coupled to the sensing die and the secure element die, the land grid array layer comprising a plurality of contacts exposed at a surface of the sensor package and configured to electrically couple to a corresponding plurality of contacts of a socket.

11. The sensor package of claim 10, wherein the sensor package comprises a thickness less than or equal to 450 micrometers.

12. The sensor package of claim 10, wherein the first redistribution layer, the second redistribution layer, and the mold material comprise a common footprint.

13. The sensor package of claim 12, wherein the sensing die and the secure element die are within the common footprint.

14. The sensor package of claim 10, wherein the sensing die and the secure element die each comprise contacts facing the first redistribution layer and the second redistribution layer.

15. The sensor package of claim 10, further comprising:
    at least one capacitor electrically coupled to the sensing die and/or the secure element die,
    wherein the mold material encapsulates the at least one capacitor.

16. The sensor package of claim 10, wherein the single mold material directly contacts both the sensing die and the secure element die.

17. A method for fabricating a sensor package, the method comprising:
    forming a fingerprint sensor comprising a first redistribution layer and a second redistribution layer on a temporary carrier;
    arranging a sensing die and a secure element die on the temporary carrier;
    encapsulating the sensing die and the secure element die with a single mold material;
    electrically coupling the sensing die to the fingerprint sensor;
    forming a third redistribution layer comprising a land grid array on the temporary carrier;
    forming a fourth redistribution layer on the third redistribution layer; and
    electrically coupling a plurality of via posts to the fourth redistribution layer;
    wherein arranging the sensing die and the secure element die on the temporary carrier comprises arranging the sensing die and the secure element die on the fourth redistribution layer such that contacts of the sensing die and contacts of the secure element die face the fourth redistribution layer and electrically contact the fourth redistribution layer;
    wherein encapsulating the sensing die and the secure element die comprises encapsulating the sensing die, the secure element die, and the plurality of via posts with the single mold material;
    wherein electrically coupling the sensing die to the fingerprint sensor comprises forming the fingerprint sensor on the mold material and electrically contacting the plurality of via posts; and
    removing the temporary carrier to expose the land grid array, the land grid array comprising a plurality of contacts configured to electrically couple to a corresponding plurality of contacts of a socket.

18. The method of claim 17, wherein the single mold material directly contacts the sensing die, the secure element die, and the plurality of via posts.

* * * * *